(12) United States Patent
Li et al.

(10) Patent No.: US 12,483,890 B2
(45) Date of Patent: Nov. 25, 2025

(54) SIGNALING PROTECTION METHOD, APPARATUS, AND SYSTEM

(71) Applicant: HUAWEI TECHNOLOGIES CO., LTD., Guangdong (CN)

(72) Inventors: Fei Li, Shenzhen (CN); Chengdong He, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 247 days.

(21) Appl. No.: 18/475,474

(22) Filed: Sep. 27, 2023

(65) Prior Publication Data
US 2024/0022910 A1  Jan. 18, 2024

Related U.S. Application Data

(63) Continuation of application No. PCT/CN2021/135507, filed on Dec. 3, 2021.

(30) Foreign Application Priority Data

Mar. 31, 2021 (CN) .......................... 202110349777.9

(51) Int. Cl.
*H04W 12/08* (2021.01)

(52) U.S. Cl.
CPC .................................. *H04W 12/08* (2013.01)

(58) Field of Classification Search
CPC ..................................................... H04W 12/08
See application file for complete search history.

(56) References Cited

U.S. PATENT DOCUMENTS

| 10,834,571 | B1* | 11/2020 | Yau ...................... H04W 12/06 |
| 11,812,271 | B2* | 11/2023 | Mahalank ........... H04W 12/122 |
| 12,192,764 | B2* | 1/2025 | Rajput ................ H04L 63/0281 |
| 2020/0344604 | A1 | 10/2020 | He et al. |
| 2021/0282078 | A1* | 9/2021 | Martinez De La Cruz ................ H04L 61/4511 |

FOREIGN PATENT DOCUMENTS

CN    109699031 A    4/2019

OTHER PUBLICATIONS

3GPP TS 33.501 V15.11.0 (Dec. 2020),3rd Generation Partnership Project, Technical Specification Group Services and System Aspects, Security architecture and procedures for 5G system, total 193 pages.
International Search Report and Written Opinion issued in PCT Application No. PCT/CN2021/135507 dated Feb. 17, 2022.
Extended European Search Report issued in EP Application No. 21934630.1 dated Aug. 6, 2024.

* cited by examiner

*Primary Examiner* — Jonathan A Bui

(57) ABSTRACT

A signaling protection method, apparatus, and system prevents an NF from spoofing an NF of another PLMN under a shared SEPP to access a peer PLMN service, so that system security is improved. A first SEPP serving a first PLMN receives a third service request that is from an NF of the first PLMN and that is sent to an NF of a second PLMN. A second SEPP serves the second PLMN, and a connection that is between the first SEPP and the second SEPP and is for the first PLMN and the second PLMN includes first N32-f. The first SEPP determines a first PLMN identifier based on configuration information. The first SEPP determines a first N32-f context context identifier corresponding to the first PLMN identifier, where the first N32-f context identifier corresponds to the first N32-f.

20 Claims, 29 Drawing Sheets

SIGNALING PROTECTION METHOD, APPARATUS, AND SYSTEM

CROSS-REFERENCE TO RELATED APPLICATIONS

This application is a continuation of International Application No. PCT/CN2021/135507, filed on Dec. 3, 2021, which claims priority to Chinese Patent Application No. 202110349777.9, filed on Mar. 31, 2021. The disclosures of the aforementioned applications are hereby incorporated by reference in their entireties.

TECHNICAL FIELD

This technology relates to the field of communication technologies, and in particular, to a signaling protection method, apparatus, and system.

BACKGROUND

In a wireless communication system, a security edge protection proxy (SEPP) is usually deployed between public land mobile networks (PLMNs) for signaling security protection. Signaling security protection is mainly implemented between the SEPP at one end and the SEPP at the other end over two links: number 32 connection (N32-c) and number 32 forwarding (N32-f). The N32-c is mainly responsible for negotiating a protection mechanism and a specific protection parameter and policy of an N32-f path between SEPPs, and generating a corresponding N32-f context. The N32-f is a forwarding path of an actual service request. During service request forwarding, an execution body processes a message by using a security context in the N32-f context.

However, with continuous enrichment of communication scenarios, there is usually a scenario in which one SEPP serves a plurality of PLMNs. For example, as shown in prior art FIG. 1, a network function consumer 1 (NFc 1) of a PLMN 1 and an NFc 2 of a PLMN 2 share a consumer security edge protection proxy (cSEPP). A network function producer 1 (NFp 1) of a PLMN 3 corresponds to a producer security edge protection proxy (pSEPP). Based on a scenario in which the PLMN 1 and the PLMN 2 share the cSEPP, when the cSEPP negotiates a protection mechanism with the pSEPP, the cSEPP sends a PLMN ID list supported by the cSEPP to the pSEPP. When verifying whether a service request is valid, the pSEPP merely verifies whether the PLMN sending the service request belongs to the PLMN list.

In this case, if the NFc 2 of the PLMN 2 spoofs the NFc 1 of the PLMN 1, and accesses the PLMN 3 via the cSEPP, based on an existing verification mechanism, the pSEPP verifies that the PLMN 2 belongs to the PLMN ID list. Therefore, the pSEPP considers that a service request sent by the PLMN 2 is a valid service request and cannot detect the malicious behavior.

In conclusion, at present, in a scenario in which the SEPP is shared, there is usually a threat that an NFc spoofs another NF to access a service, resulting in poor security.

SUMMARY

An example embodiment provides a signaling protection method, apparatus, and system, to prevent an NF from spoofing an NF of another PLMN under a shared SEPP to access a peer PLMN service, so that system security is improved.

According to a first aspect, an example embodiment provides a signaling protection method, where the method includes:

A first security edge protection proxy serving a first public land mobile network receives a third service request that is from a network function of the first public land mobile network and that is sent to a network function of a second public land mobile network, where a second security edge protection proxy serves the second public land mobile network, and a connection that is between the first security edge protection proxy and the second security edge protection proxy and is for the first public land mobile network and the second public land mobile network includes first N32-f; the first security edge protection proxy determines a first public land mobile network identifier based on configuration information; determining, by the first security edge protection proxy, a first N32-f context context identifier (i.e., a context identifier of a first N32-f context) corresponding to the first public land mobile network identifier, where the first N32-f context identifier corresponds to the first N32-f; the first security edge protection proxy determines a first service request based on the third service request; and the first security edge protection proxy sends the first service request to the second security edge protection proxy, where the first service request includes the first N32-f context identifier.

Based on the solution, before sending a service request to a second SEPP, the first SEPP can determine a real first PLMN identifier based on the configuration information, to prevent the first PLMN from being spoofed as another PLMN to access a peer PLMN service.

In a possible implementation, the first security edge protection proxy is connected to a third public land mobile network and the first public land mobile network. A connection that is between the first security edge protection proxy and the second security edge protection proxy and is for the third public land mobile network and the second public land mobile network includes second N32-f, where the second N32-f corresponds to a second N32-f context identifier.

In a possible implementation, the first security edge protection proxy determines the first N32-f context identifier based on the first public land mobile network identifier and a first mapping relationship between the first N32-f context identifier and the first public land mobile network identifier.

In a possible implementation, the method further includes: The first security edge protection proxy obtains a third N32-f context identifier carried in the security negotiation response from a security negotiation response received from the second security edge protection proxy. The first security edge protection proxy generates a third N32-f context based on the security negotiation response, where the third N32-f context includes the third N32-f context identifier, and the third N32-f context or the third N32-f context identifier corresponds to the first public land mobile network identifier. Before the first security edge protection proxy determines the first service request based on the third service request, the method further includes: The first security edge protection proxy determines the third N32-f context based on the first public land mobile network identifier. That the first security edge protection proxy determines a first service request based on the third service request includes: The first security edge protection proxy performs security protection on the third service request by using the third N32-f context, to obtain the first service request.

In a possible implementation, before the first security edge protection proxy sends the first service request to the second security edge protection proxy, the first security edge protection proxy sends a parameter exchange request to the second security edge protection proxy. The parameter exchange request includes the first N32-f context identifier generated when the first security edge protection proxy is used to perform security parameter negotiation, and a public land mobile network identifier pair that is of public land mobile networks performing security parameter negotiation and that is determined by the first security edge protection proxy. The public land mobile network identifier pair includes the first public land mobile network identifier and a second public land mobile network identifier.

In a possible implementation, the first security edge protection proxy determines the first public land mobile network identifier based on transport layer information of the network function of the first public land mobile network.

In a possible implementation, before the first security edge protection proxy corresponding to the first public land mobile network receives the third service request sent by the network function of the first public land mobile network, the first security edge protection proxy determines the public land mobile network identifier pair that is of the public land mobile networks that perform interaction access through the second security edge protection proxy. The public land mobile network identifier pair includes the first public land mobile network identifier and the second public land mobile network identifier. The first security edge protection proxy notifies the second security edge protection proxy of the public land mobile network identifier pair for interaction access.

In a possible implementation, the first security edge protection proxy determines an identifier pair that is of public land mobile networks performing interaction access and that corresponds to a link that needs to be established between the first security edge protection proxy and the second security edge protection proxy. The first security edge protection proxy determines an identifier pair that is of public land mobile networks performing interaction access and that corresponds to a link that needs to be subsequently established between the first security edge protection proxy and the second security edge protection proxy. Alternatively, the first security edge protection proxy determines an identifier pair that is of public land mobile networks performing interaction access and that corresponds to a link that has been established between the first security edge protection proxy and the second security edge protection proxy.

In a possible implementation, the first SEPP is a transit device between a third SEPP corresponding to the NF of the first PLMN, and the second SEPP.

According to a second aspect, an example embodiment provides a signaling protection method, where the method includes:

A second security edge protection proxy serving a second public land mobile network receives a first service request from a first security edge protection proxy serving a first public land mobile network. A connection that is between the second security edge protection proxy and the first security edge protection proxy and is for the second public land mobile network and the first public land mobile network includes first N32-f. The first service request includes a first N32-f context context identifier, and the first N32-f context identifier corresponds to the first N32-f. The second security edge protection proxy determines a second service request based on the first service request. The second security edge protection proxy determines the corresponding second public land mobile network based on the first N32-f context identifier. The second security edge protection proxy sends the second service request to a network function of the second public land mobile network.

Based on the solution, when receiving a service request sent by the first SEPP, the second SEPP can determine a real second PLMN corresponding to the first N32-f context identifier in the first service request, to prevent a PLMN from being spoofed as another PLMN to access a peer PLMN service.

In a possible implementation, the second security edge protection proxy is connected to a fourth public land mobile network and the second public land mobile network. A connection that is between the second security edge protection proxy and the first security edge protection proxy and is for the fourth public land mobile network and the first public land mobile network includes second N32-f, where the second N32-f corresponds to a second N32-f context identifier.

In a possible implementation, the second security edge protection proxy determines the second public land mobile network based on the first N32-f context identifier and a first mapping relationship between the first N32-f context identifier and a second public land mobile network identifier.

In a possible implementation, the method further includes: The second security edge protection proxy sends a security negotiation response to the first security edge protection proxy, where the security negotiation response carries a third N32-f context identifier. After the second security edge protection proxy receives the first service request from the first security edge protection proxy corresponding to the first public land mobile network, the method includes: The second security edge protection proxy performs security verification on the first service request by using a third N32-f context corresponding to the third N32-f context identifier.

In a possible implementation, before the second security edge protection proxy corresponding to the second public land mobile network receives the first service request from the first security edge protection proxy corresponding to the first public land mobile network, the second security edge protection proxy receives a parameter exchange request from the first security edge protection proxy. The parameter exchange request includes the first N32-f context identifier generated when the first security edge protection proxy is used to perform security parameter negotiation, and a public land mobile network identifier pair that is of public land mobile networks performing security parameter negotiation and that is determined by the first security edge protection proxy. The public land mobile network identifier pair includes a first public land mobile network identifier and the second public land mobile network identifier.

According to a third aspect, an example embodiment provides a signaling protection method, where the method includes:

A second SEPP receives a first request from a first SEPP, where the first request carries information about a first PLMN and requested information about a second PLMN, and an N32-c link needs to be established between the first PLMN and the second PLMN. The second SEPP determines, based on the first request, a first PLMN ID and a requested second PLMN ID.

Based on the solution, the first SEPP and the second SEPP determine a PLMN identifier pair for a roaming service on the N32-c link as a first PLMN identifier and a second PLMN identifier.

In a possible implementation, the first SEPP is a transit device between a third SEPP corresponding to an NF of a first PLMN, and the second SEPP.

According to a fourth aspect, an example embodiment provides a signaling protection method, where the method includes:

A first SEPP determines a first PLMN and a second PLMN between which an N32-c link needs to be established. The first SEPP generates a first request, where the first request carries information about the first PLMN and requested information about the second PLMN, and the N32-c link needs to be established between the first PLMN and the second PLMN. The first SEPP sends the first request to a second SEPP.

Based on the solution, the first SEPP and the second SEPP determine a PLMN identifier pair for a roaming service on the N32-c link as a first PLMN identifier and a second PLMN identifier.

In a possible implementation, the first SEPP is a transit device between a third SEPP corresponding to an NF of the first PLMN, and the second SEPP.

According to a fifth aspect, an example embodiment provides a signaling protection method, where the method includes:

A second SEPP receives a first request from a first SEPP, where the first request carries an ID of a first PLMN and an ID of a second PLMN between which an N32-c link needs to be established. The second SEPP receives the first request, to obtain the first PLMN ID and the second PLMN ID.

Based on the solution, the first SEPP and the second SEPP determine a PLMN identifier pair for a roaming service on the N32-c link as a first PLMN identifier and a second PLMN identifier.

In a possible implementation, the first SEPP is a transit device between a third SEPP corresponding to an NF of a first PLMN, and the second SEPP.

According to a sixth aspect, an example embodiment provides a signaling protection method, where the method includes:

A first SEPP determines a first PLMN and a second PLMN between which an N32-c link needs to be established. The first SEPP generates a first request, where the first request carries an identifier of the first PLMN and a requested identifier of the second PLMN between which the N32-c link needs to be established. The first SEPP sends the first request to a second SEPP. Based on the solution, the first SEPP and the second SEPP determine a PLMN identifier pair for a roaming service on the N32-c link as the first PLMN identifier and the second PLMN identifier.

In a possible implementation, the first SEPP is a transit device between a third SEPP corresponding to an NF of the first PLMN, and the second SEPP.

According to a seventh aspect, an example embodiment provides a signaling protection method, where the method includes:

A second SEPP receives a first request from a first SEPP, where the first request carries a first PLMN identifier list served by the first SEPP. The second SEPP stores the first PLMN ID list and a correspondence between the first PLMN ID list and the first SEPP.

Based on the solution, the first SEPP and the second SEPP may be enabled to mutually obtain a PLMN identifier list of a peer service. In a possible implementation, the second SEPP sends a first response to the first SEPP, where the first response carries a second PLMN identifier list served by the second SEPP.

In a possible implementation, the first SEPP is a transit device between a third SEPP corresponding to an NF of a first PLMN, and the second SEPP.

According to an eighth aspect, an example embodiment provides a signaling protection method, where the method includes:

A first SEPP determines a served first PLMN identifier list. The first SEPP generates a first request, where the first request carries a first PLMN identifier list served by a second SEPP. The first SEPP sends the first request to the second SEPP.

Based on the solution, the first SEPP and the second SEPP may be enabled to mutually obtain a PLMN identifier list of a peer service.

In a possible implementation, the first SEPP receives a first response from the second SEPP, where the first response carries a second PLMN identifier list served by the second SEPP.

In a possible implementation, the first SEPP stores the second PLMN identifier list and a correspondence between the second PLMN identifier list and the second SEPP.

In a possible implementation, the first SEPP is a transit device between a third SEPP corresponding to an NF of a first PLMN, and the second SEPP.

According to a ninth aspect, an example embodiment provides a signaling protection method, where the method includes:

A second SEPP receives a first service request from a first SEPP, where the first service request carries a first PLMN identifier. The second SEPP determines, based on a mapping relationship between a second PLMN identifier list and a first PLMN identifier list, that the first PLMN identifier is valid. The second SEPP sends a second service request to an NF of a second PLMN, where the second service request is determined by the second SEPP based on the first service request.

In a possible implementation, before the second SEPP determines, based on the mapping relationship between the second PLMN identifier list and the first PLMN identifier list, that the first PLMN identifier is valid, the second SEPP determines, based on a first N32-f context identifier carried in the second service request, a corresponding first N32-f context. The second SEPP performs decryption and/or verification on the second service request based on the first N32-f context.

In a possible implementation, when the first N32-f context stores a second PLMN list, the second SEPP determines whether the first PLMN identifier is in the first N32-f context. If the first PLMN identifier is in the first N32-f context, the second SEPP determines that the first PLMN identifier is valid. If the first PLMN identifier is not in the first N32-f context, the second SEPP determines that the first PLMN identifier is invalid.

In a possible implementation, before the second SEPP receives the first service request from the first SEPP, the second SEPP receives a first request from the first SEPP, where the first request carries the first PLMN identifier list served by the first SEPP.

In a possible implementation, after the second SEPP receives the first service request from the first SEPP, the second SEPP stores the first PLMN ID list and a correspondence between the first PLMN ID list and the first SEPP.

In a possible implementation, the method further includes: The second SEPP sends a first response to the first SEPP, where the first response carries the second PLMN ID list served by the second SEPP.

In a possible implementation, the first SEPP is a transit device between a third SEPP corresponding to an NF of a first PLMN, and the second SEPP.

According to a tenth aspect, an example embodiment provides a signaling protection method, where the method includes:

A first SEPP receives a third service request from an NF in a first PLMN, where the third service request includes a first PLMN identifier; the first SEPP determines that the first PLMN identifier corresponding to the first PLMN is in a first PLMN identifier list; the first SEPP sends a first service request to a second SEPP, where the first service request carries a first N32-f context identifier generated by the first SEPP, and the first PLMN identifier; and the first service request is obtained by the first SEPP based on the third service request.

In a possible implementation, before the first SEPP sends the first service request to the second PSEPP, the first SEPP sends a first request to the second SEPP, where the first request carries the first PLMN identifier list served by the first SEPP.

In a possible implementation, the method further includes: The first SEPP receives a first response sent by the second SEPP, where the first response carries a second PLMN ID list served by the second SEPP.

In a possible implementation, the first SEPP is a transit device between a third SEPP corresponding to an NF of the first PLMN, and the second SEPP.

According to an eleventh aspect, an embodiment provides a signaling protection apparatus. The apparatus may be an SEPP, or may be a chip configured for a first SEPP. The apparatus may implement any one of the first aspect to the tenth aspect, or perform any method in any one of possible implementations of the first aspect to the tenth aspect. This function may be implemented by hardware, or may be implemented by hardware executing corresponding software. The hardware or the software includes one or more modules corresponding to the function.

According to a twelfth aspect, an embodiment provides a signaling protection apparatus, including a processor and a memory. The memory is configured to store computer-executable instructions. When the apparatus runs, the processor executes the computer-executable instructions stored in the memory, to enable the apparatus to perform any one of the first aspect to the tenth aspect, or perform any method in any one of possible implementations of the first aspect to the tenth aspect.

According to a thirteenth aspect, an embodiment further provides a computer-readable storage medium, where the computer-readable storage medium stores instructions. When the instructions are run on a computer, a processor is enabled to perform any one of the first aspect to the tenth aspect, or perform any method in any one of possible implementations of the first aspect to the tenth aspect.

According to a fourteenth aspect, an embodiment further provides a computer program product, where the computer product includes a computer program. When the computer program is run, the processor is enabled to perform any one of the first aspect to the tenth aspect, or perform any method in any one of possible implementations of the first aspect to the tenth aspect.

According to a fifteenth aspect, an embodiment further provides a chip system, including a processor and a memory. The memory is configured to store a computer program, and the processor is configured to invoke the computer program from the memory and run the computer program, to enable a device on which the chip system is installed to perform any one of the first aspect to the tenth aspect, or perform any method in any one of possible implementations of the first aspect to the tenth aspect.

According to a sixteenth aspect, an embodiment further provides a signaling protection system, including a first security edge protection proxy SEPP corresponding to a first public land mobile network PLMN, a network function NF of the first PLMN, a second SEPP corresponding to a second PLMN, and an NF of the second PLMN. A connection that is between the second SEPP and the first SEPP and is for the second PLMN and the first PLMN includes first N32-f.

The NF of the first PLMN is used to send a third service request to the first SEPP.

The first SEPP is configured to: receive the third service request sent by the NF of the first PLMN; determine the first PLMN identifier based on configuration information; determine a first N32-f context context identifier corresponding to the first PLMN identifier; determine a first service request based on the third service request; and send the first service request to the second SEPP, where the first service request includes the first N32-f context identifier.

The second SEPP is configured to: receive the first service request from the first SEPP; determine a second service request based on the first service request; determine the corresponding second PLMN based on the first N32-f context identifier; and send the second service request to the NF of the second PLMN.

The NF of the second PLMN is used to receive the second service request sent by the second SEPP.

In a possible implementation, the signaling protection system further includes a third SEPP.

DESCRIPTION OF EMBODIMENTS

To describe technical solutions more clearly and completely, the following describes embodiments with reference to the accompanying drawings.

Embodiments provide a signaling protection method to resolve a problem that at present, in a scenario in which an SEPP is shared, there is usually a threat that an NFc spoofs another NF to access a service, resulting in poor security.

The technical solutions in embodiments may be applied to various communication systems, for example, a general packet radio service (GPRS), a long term evolution (LTE) system, an LTE frequency division duplex (FDD) system, an LTE time division duplex (TDD), a worldwide interoperability for microwave access (WiMAX) communication system, a fifth generation (5G) system, or new radio (NR), or applied to a future communication system or another similar communication system, such as a 6G system.

The 5G system (which may alternatively be referred to as a new radio system) is used as an example. Specifically, in a scenario in which a plurality of PLMNs share one SEPP, embodiments provide a more complete and secure signaling protection mechanism.

Figure 1:
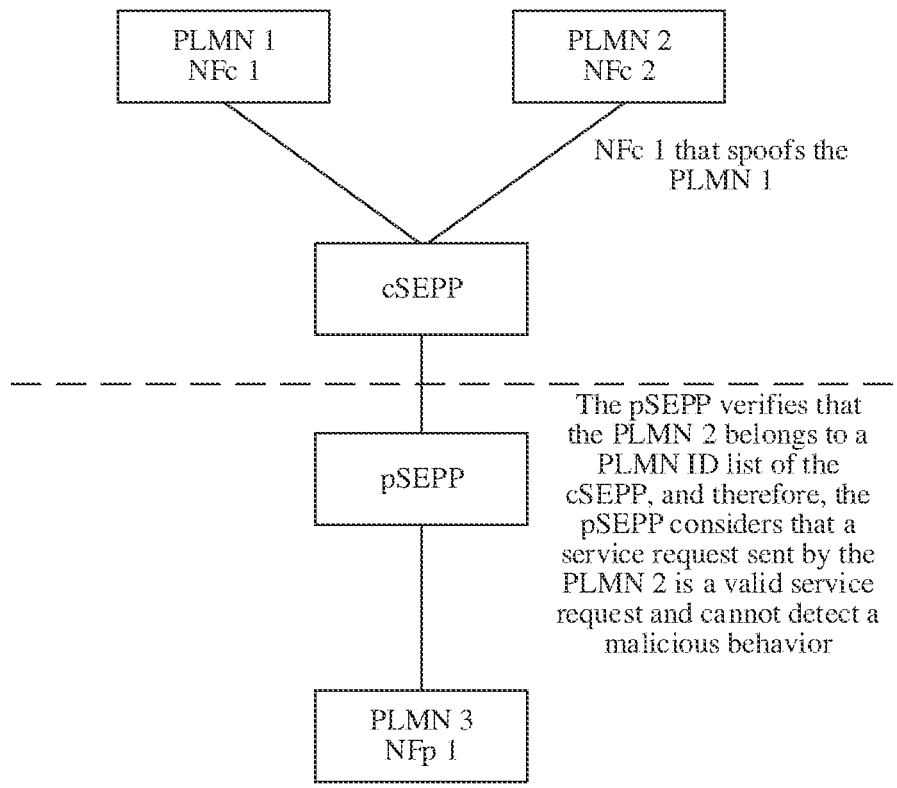
FIG. 1 is a schematic flowchart of an existing prior art signaling protection method.
Figure 2:
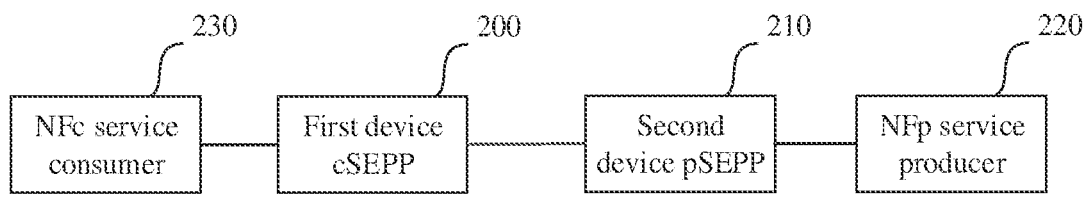
FIG. 2 is a schematic diagram of an architecture of a first signaling protection system according to an example embodiment.

For ease of understanding embodiments, a communication system shown in FIG. 2 is first used as an example to describe in detail the communication system to which embodiments are applicable. As shown in FIG. 2, the communication system includes a first device 200 (for example, a source SEPP, which may be referred to as cSEPP for short) and a second device 210 (for example, a target SEPP, which may be referred to as pSEPP for short).

The first device 200 is a security edge protection proxy, and is responsible for signaling security protection between the first device 200 and a home network in a roaming scenario.

The second device 210 is a security edge protection proxy, and is responsible for signaling security protection between the second device 210 and a visited network in the roaming scenario.

Further, in this embodiment, the communication system may further include other devices, and is not specifically limited to the following types.

For example, the communication system may further include an NF service producer 220 (NF service producer) and an NF service consumer 230 (NF service consumer) that are shown in FIG. 2, and the like.

The NF service producer 220 may be a party whose function is invoked in a service-based architecture in the 5G system, for example, a session management network element (session management function, SMF).

The NF service consumer 230 may be a party whose function is invoked in the service-based architecture in the 5G system, for example, a mobility management function network element (access and mobility management function, AMF), or the SMF.

Further, in this embodiment, the first device may include at least one NF, and each NF in the first device corresponds to one PLMN.

The second device may include at least one NF, and each NF in the second device corresponds to one PLMN.

Figure 3:
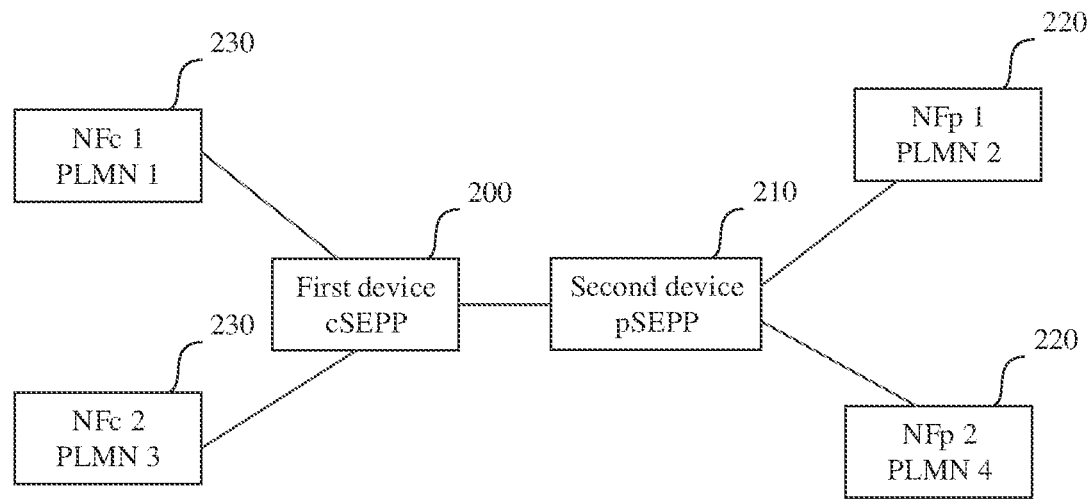
FIG. 3 is a schematic diagram of an architecture of a second signaling protection system according to an example embodiment.

For example, as shown in FIG. 3, assuming that PLMNs corresponding to the first device are a PLMN 1 and a PLMN 3, NFcs corresponding to the first device are an NFc 1 and an NFc 2. A network accessed by the NFc 1 is the PLMN 1, and a network accessed by the NFc 2 is the PLMN 3. Assuming that PLMNs corresponding to the second device are a PLMN 2 and a PLMN 4, and NFps corresponding to the second device are an NFp 1 and an NFp 2. A network accessed by the NFp 1 is the PLMN 2, and a network accessed by the NFp 2 is the PLMN 4.

Figure 4:
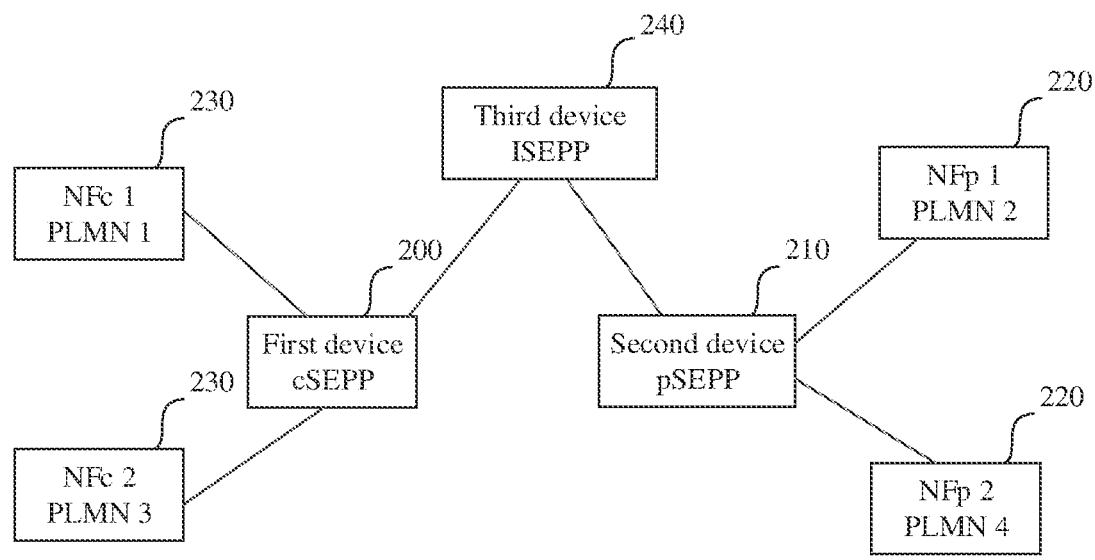
FIG. 4 is a schematic diagram of an architecture of a third signaling protection system according to an example embodiment.

As shown in FIG. 4, the communication system may further include a third device 240 (a third-party SEPP, which may be referred to as ISEPP for short). For example, in a hub service application scenario, there is an intermediate node between the first device 200 (the cSEPP) and the second device 210 (the pSEPP).

Some terms in embodiments are explained and described below for ease of understanding.

(1) An N32-c is one of links used when an SEPP is deployed between PLMNs for signaling security protection. The N32-c is mainly responsible for negotiating a protection mechanism and a specific protection parameter and policy of an N32-f path between SEPPs, and generating a corresponding N32-f context.

When forwarding a service request, the SEPP and an IPX use a context in the N32-f context to process the message, for example, perform encryption, integrity, or modification.

Optionally, in embodiments, the N32-c link may be a TLS link.

(2) N32-f is another link used when an SEPP is deployed between PLMNs for signaling security protection, and is mainly used as a forwarding path for an actual service request.

In addition, the terms "system" and "network" in embodiments may be used interchangeably. "At least one" means one or more, and "a plurality of" means two or more than two. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

Unless otherwise stated, ordinal numbers such as "first" and "second" mentioned in embodiments are used to distinguish between a plurality of objects, and are not intended to limit a sequence, a time sequence, priorities, or importance of the plurality of objects. In addition, the terms "include" and "have" in embodiments, claims, and the accompanying drawings are not exclusive. For example, a process, a method, a system, a product, or a device including a series of steps or modules is not limited to listed steps or modules, and may further include steps or modules that are not listed.

Figure 5A:
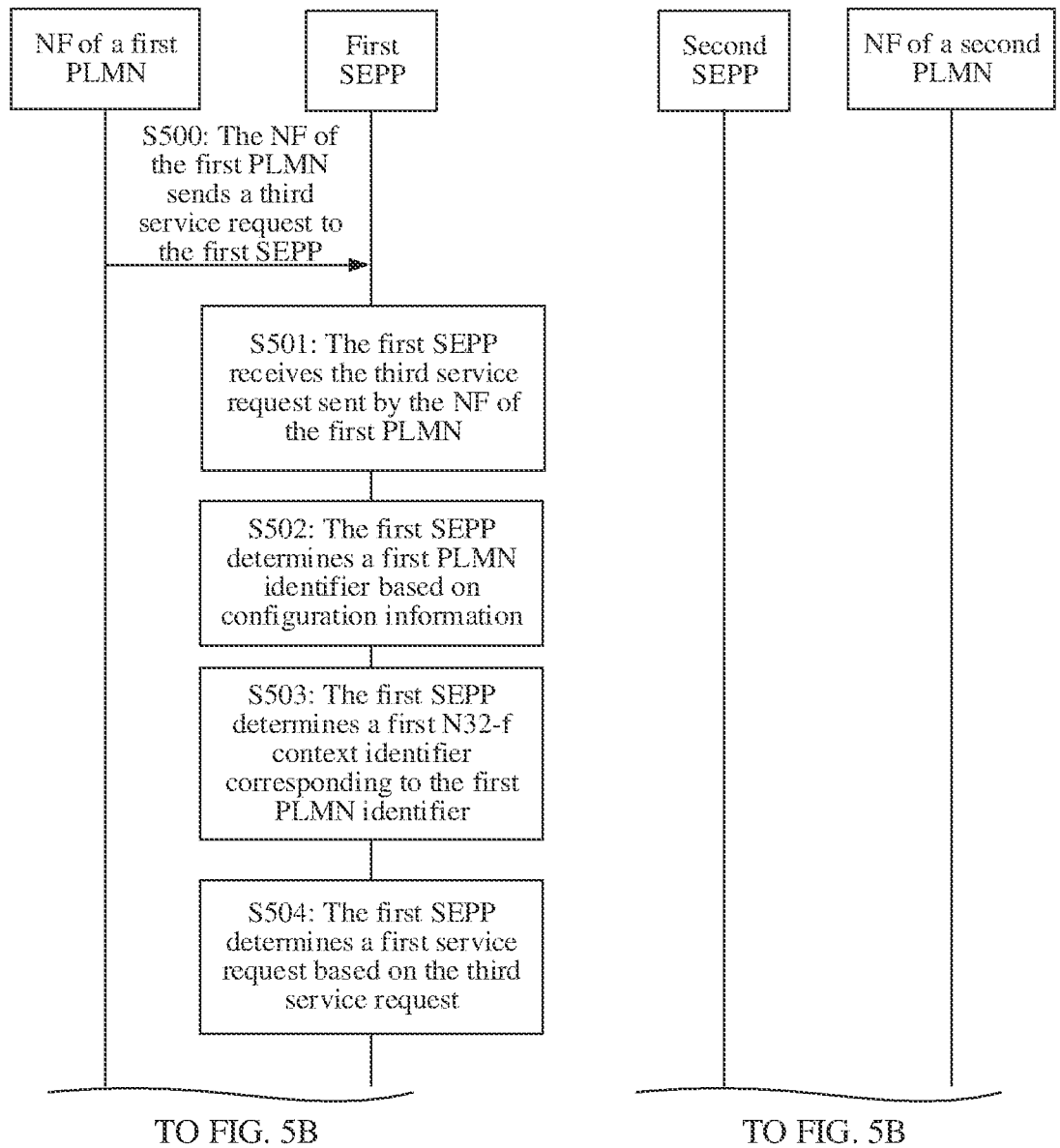
FIG. 5A and FIG. 5B are a schematic diagram of a processing procedure of a signaling protection system according to an example embodiment.
Figure 5B:
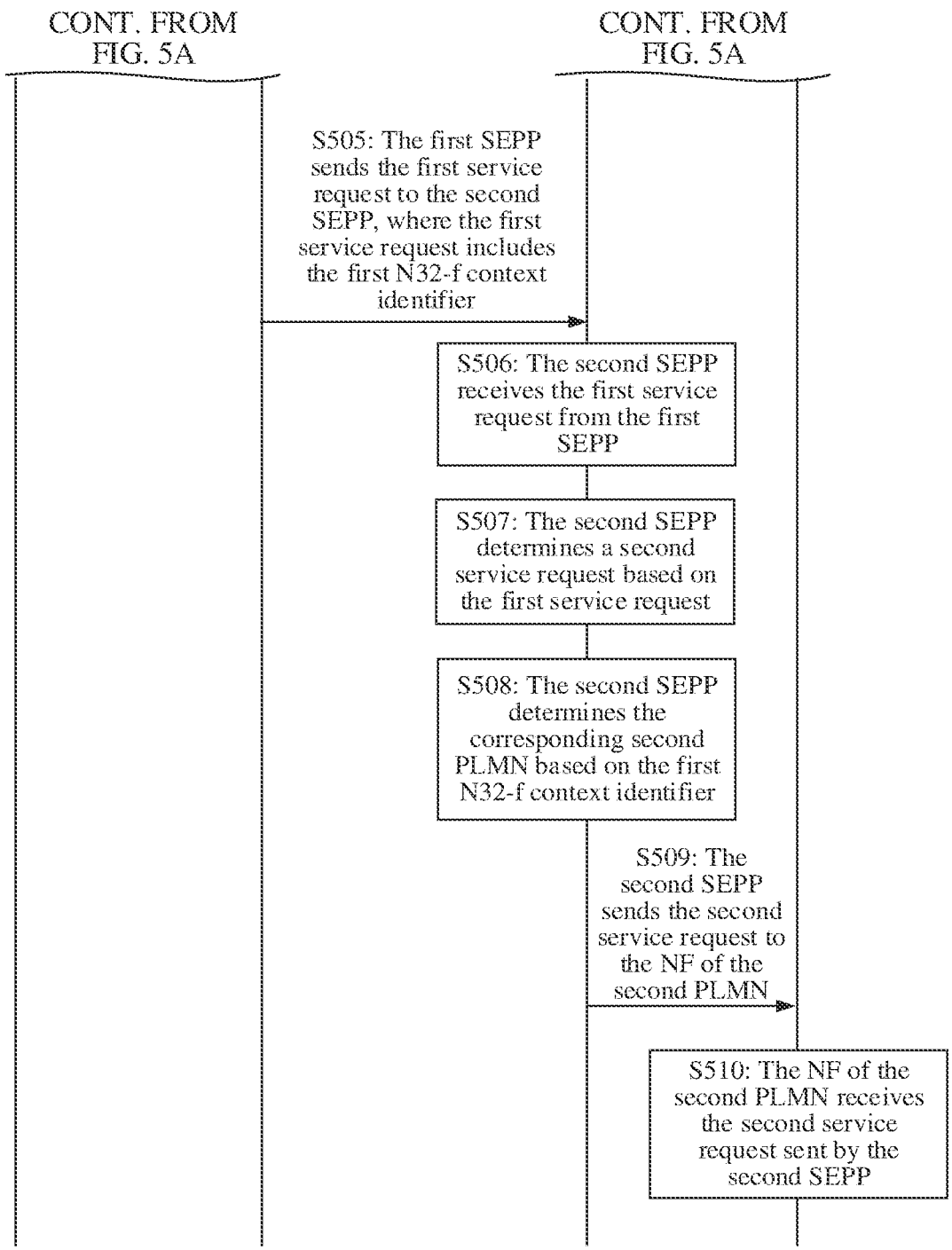

Therefore, as shown in FIG. 5A and FIG. 5B, an embodiment provides a signaling protection system, where the system includes the following steps.

S500: An NF of a first PLMN sends a third service request to a first SEPP.

S501: The first SEPP receives the third service request sent from the NF of the first PLMN to an NF of a second PLMN.

A second SEPP serves the second PLMN, and a connection that is between the first SEPP and the second SEPP and is for the first PLMN and the second PLMN includes first N32-f.

S502: The first SEPP determines a first PLMN identifier based on configuration information.

S503: The first SEPP determines a first N32-f context identifier corresponding to the first PLMN identifier, where the first N32-f context identifier corresponds to the first N32-f.

S504: The first SEPP determines a first service request based on the third service request.

S505: The first SEPP sends the first service request to the second SEPP, where the first service request includes the first N32-f context identifier.

S506: The second SEPP receives the first service request from the first SEPP.

S507: The second SEPP determines a second service request based on the first service request.

S508: The second SEPP determines the corresponding second PLMN based on the first N32-f context identifier.

S509: The second SEPP sends the second service request to the NF of the second PLMN.

S510: The NF of the second PLMN receives the second service request sent by the second SEPP.

In the foregoing method, before sending a service request to the second SEPP, the first SEPP can determine a real first PLMN identifier based on the configuration information, to prevent the first PLMN from being spoofed as another PLMN to access a peer PLMN service.

Further, in an optional manner in this embodiment, before performing S500, the first SEPP further obtains, from a security negotiation response received from the second SEPP, a third N32-f context identifier carried in the security negotiation response.

Therefore, the first SEPP generates a third N32-f context based on the security negotiation response.

Further, to better ensure security, the first SEPP may perform security protection on the third service request by using the third N32-f context, to obtain the first service request.

In an optional manner in this embodiment, the third N32-f context includes a third N32-f context identifier, and the third N32-f context or the third N32-f context identifier corresponds to a first public land mobile network identifier.

In addition, in this embodiment, the third N32-f context or the third N32-f context identifier may further correspond to the first N32-f.

In other words, in this embodiment, the first N32-f may correspond to two IDs/contexts, to be specific, SEPPs on two sides each have one ID/context.

To better describe a signaling protection method provided in an example embodiment, this specification separately describes different communication system architectures, and is not specifically limited to the following types.

Architecture 1: As Shown in the System Architecture in FIG. 2 or FIG. 3, the First Device and the Second Device are Interacted.

In the current system architecture 1, there are a plurality of application scenarios in which the signaling protection method is performed in this embodiment, and the application scenarios are not specifically limited to the following cases.

Scenario 1: PLMNs Shares Neither an N32-c nor N32-f.

The scenario 1 may be understood as follows: A first SEPP (a cSEPP) and a second SEPP (a pSEPP) generate one N32-c link and one N32-f link for each pair of PLMNs for roaming services.

An execution process of the signaling protection method may be divided into three phases.

First Phase: An Independent N32-c Link is Established for Each Pair of PLMNs for Roaming Services.

Figure 6:
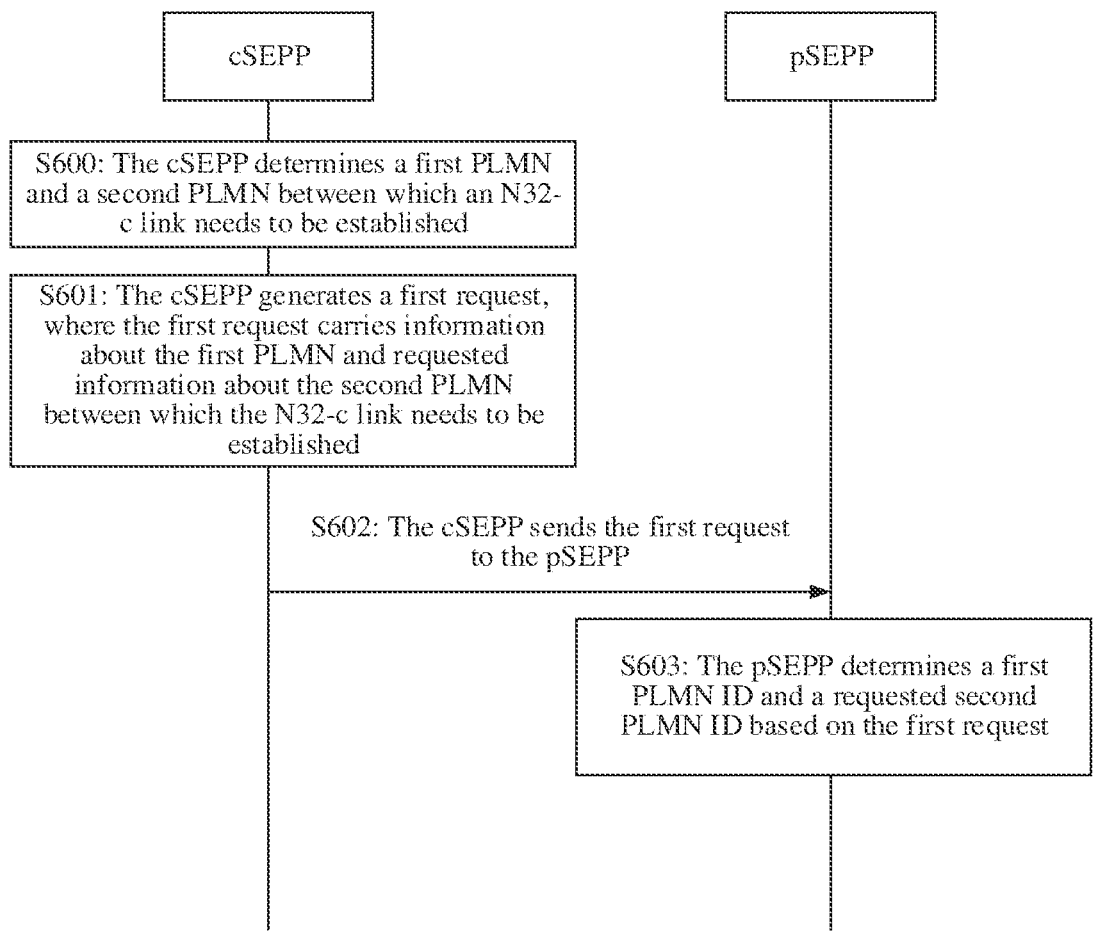
FIG. 6 is a schematic flowchart of a first phase of a first signaling protection method according to an example embodiment.

Specifically, as shown in FIG. 6, steps in a first phase of a signaling protection method according to an embodiment are as follows:

S600: The cSEPP determines a first PLMN and a second PLMN between which an N32-c link needs to be established.

S601: The cSEPP generates a first request, where the first request carries information about the first PLMN and requested information about the second PLMN between which the N32-c link needs to be established.

The first request may be a link request or a TLS request. This is not specifically limited herein.

Optionally, the information about the first PLMN includes but is not limited to some or all of the following:
an IP, a port number, a domain name, and a certificate that correspond to the first PLMN.

The information about the second PLMN includes but is not limited to some or all of the following:
an IP, a port number, a domain name, and a certificate that correspond to the second PLMN.

S602: The cSEPP sends the first request to a pSEPP.

S603: The pSEPP determines a first PLMN ID and a requested second PLMN ID based on the first request.

Optionally, the pSEPP determines the first PLMN based on the information about the first PLMN carried in the first request, and determines the second PLMN based on the information about the second PLMN carried in the first request.

Further, after determining the first PLMN and the second PLMN between which the N32-c link needs to be established, the cSEPP may store a mapping relationship between the link and a PLMN ID pair. After determining the first PLMN and the second PLMN based on the N32-c link, the pSEPP may store the mapping relationship between the link and the PLMN ID pair.

Based on the foregoing steps in this embodiment, the cSEPP and the pSEPP determine that the PLMN ID pair for roaming services on the N32-c link is the first PLMN and the second PLMN.

Figure 7:
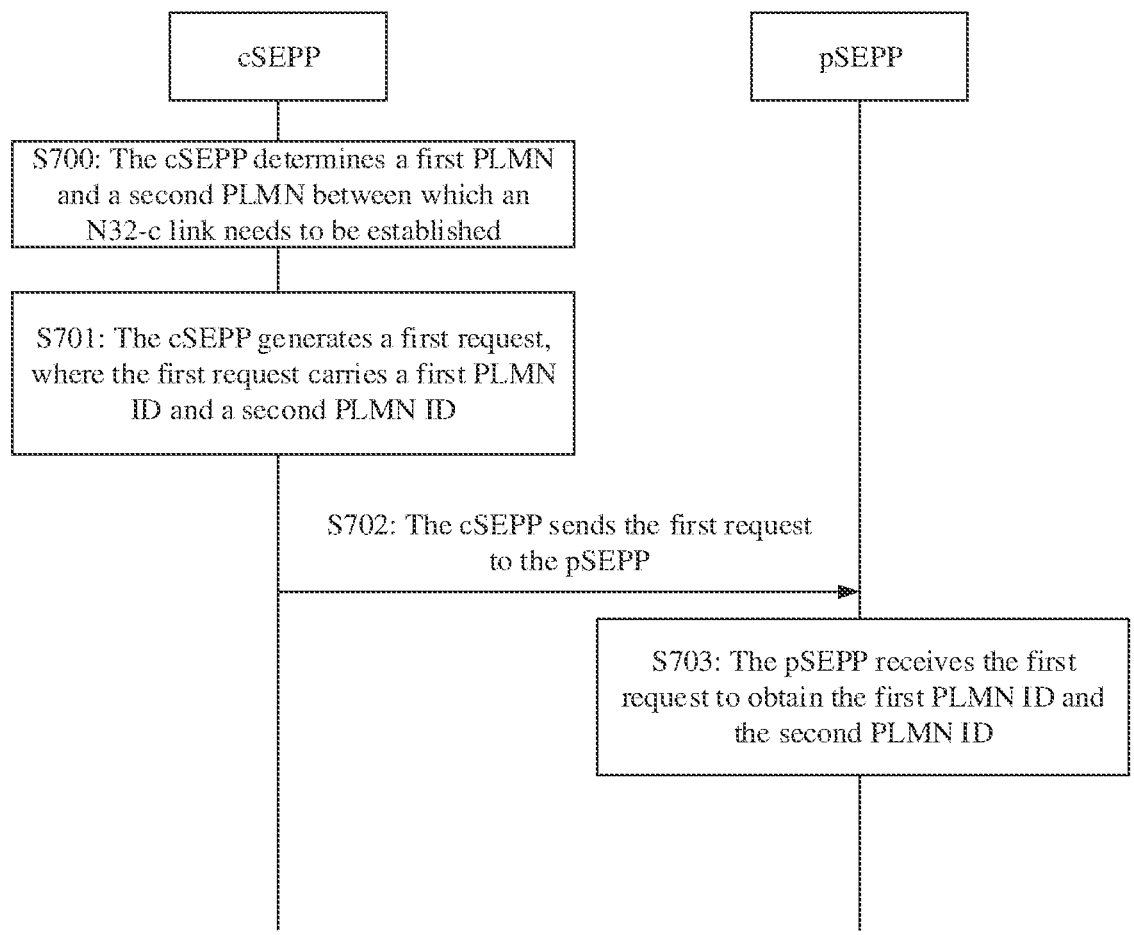
FIG. 7 is a schematic flowchart of a first phase of a second signaling protection method according to an example embodiment.

Specifically, as shown in FIG. 7, steps in a first phase of another signaling protection method according to an embodiment are as follows:

S700: The cSEPP determines a first PLMN and a second PLMN between which an N32-c link needs to be established.

S701: The cSEPP generates a first request, where the first request carries a first PLMN ID and a second PLMN ID.

The first request may be a capability negotiation request, an N32-c setup request, or a roaming PLMN ID pair negotiation request. This is not specifically limited herein.

S702: The cSEPP sends the first request to a pSEPP.

S703: The pSEPP receives the first request, to obtain the first PLMN ID and the second PLMN ID.

Further, after determining the first PLMN and the second PLMN between which a first link needs to be established, the cSEPP may store a mapping relationship between the link and a PLMN ID pair. After determining the first PLMN and the second PLMN based on the first link, the pSEPP may store the mapping relationship between the link and the PLMN ID pair.

Based on the foregoing steps in this embodiment, the cSEPP and the pSEPP determine that the PLMN ID pair for roaming services on the N32-c link is the first PLMN and the second PLMN.

Second Phase: Capability Negotiation and Security Context Establishment Phase.

The first SEPP and the second SEPP perform capability negotiation and security context establishment on the foregoing established N32-c link. Because the link exclusively belongs to the first PLMN and the second PLMN, a negotiated capability and a security context correspond to the first PLMN and the second PLMN.

Figure 8A:
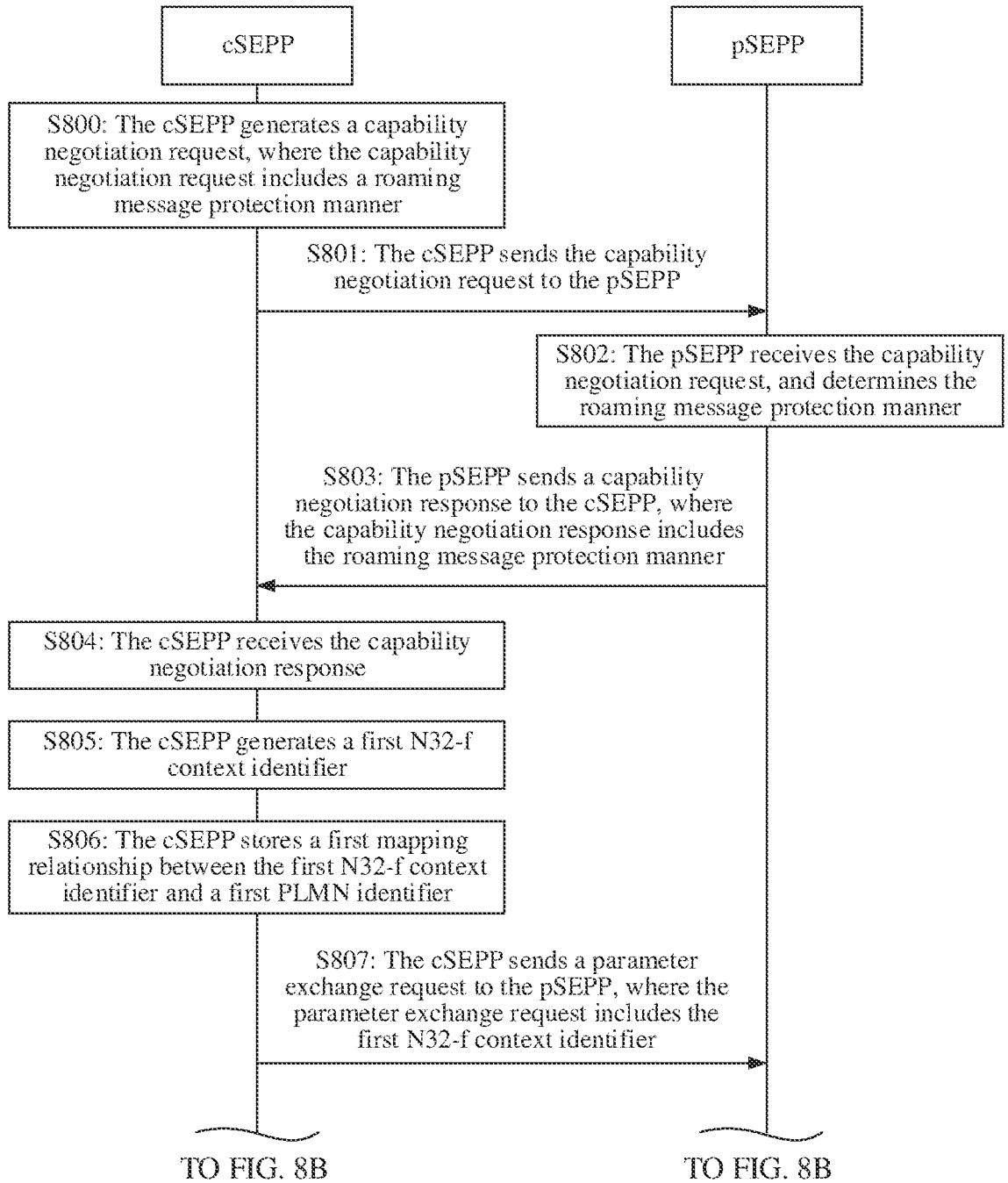
FIG. 8A and FIG. 8B are a schematic flowchart of a second phase of a first signaling protection method according to an example embodiment.
Figure 8B:
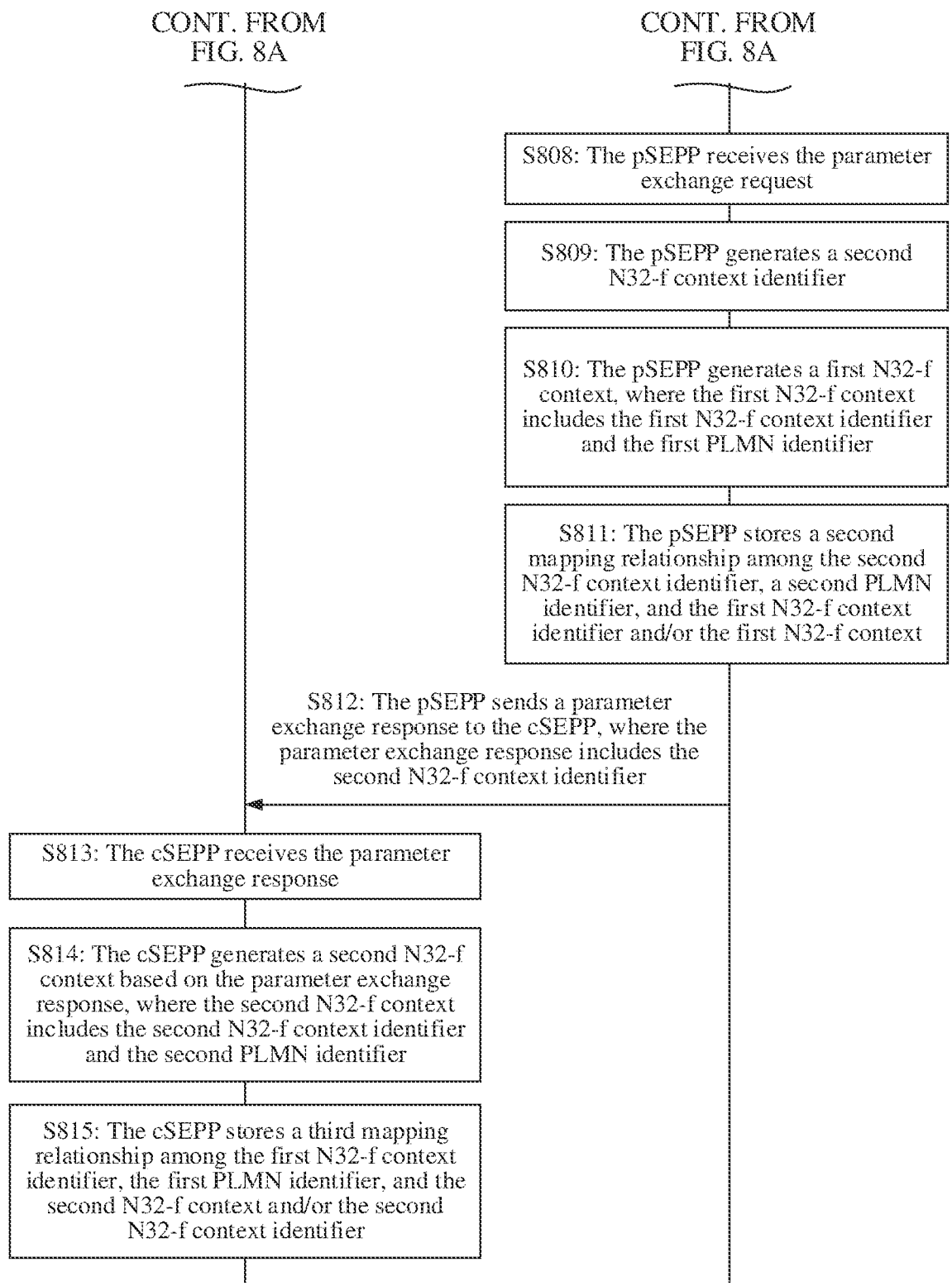

Specifically, as shown in FIG. 8A and FIG. 8B, steps in a second phase of the signaling protection method according to an embodiment are as follows:

S800: The cSEPP generates a capability negotiation request, where the capability negotiation request includes a roaming message protection manner.

In an optional manner in this embodiment, the roaming message protection manner may be a PRINS or a TLS. This is not limited herein.

S801: The cSEPP sends the capability negotiation request to the pSEPP.

S802: The pSEPP receives the capability negotiation request, and determines the roaming message protection manner.

S803: The pSEPP sends a capability negotiation response to the first SEPP, where the capability negotiation response includes the roaming message protection manner.

S804: The cSEPP receives the capability negotiation response.

S805: The cSEPP generates a first N32-f context identifier.

S806: The cSEPP stores a first mapping relationship between the first N32-f context identifier and the first PLMN identifier.

For example, the first mapping relationship stored by the cSEPP is shown in the following table.

| First N32-f context identifier | First PLMN identifier |
|---|---|

Optionally, the cSEPP may locally store the first mapping relationship between the first N32-f context identifier and the first PLMN identifier, or store the first mapping relationship in a third-party device that can be accessed by the cSEPP.

S807: The cSEPP sends a parameter exchange request to the pSEPP, where the parameter exchange request includes the first N32-f context identifier.

Optionally, the parameter exchange request further includes a protection rule of a service request, and the like.

S808: The pSEPP receives the parameter exchange request.

S809: The pSEPP generates a second N32-f context identifier.

S810: The pSEPP generates a first N32-f context, where the first N32-f context includes the first N32-f context identifier and the first PLMN identifier.

S811: The pSEPP stores a second mapping relationship among the second N32-f context identifier, a second PLMN identifier, and the first N32-f context identifier and/or the first N32-f context.

In an optional manner in this embodiment of an example embodiment, after performing step S809, the pSEPP establishes and stores a mapping relationship between the second N32-f context identifier and the second PLMN identifier.

Then, after performing step S810, the pSEPP establishes a mapping relationship between the second N32-f context identifier and the first N32-f context.

An optional implementation of the second mapping relationship is storing the second PLMN identifier and/or the second N32-f context identifier in the first N32-f context.

It should be noted that the second mapping relationship may be indirectly determined, or may be directly determined.

S812: The pSEPP sends a parameter exchange response to the cSEPP, where the parameter exchange response includes the second N32-f context identifier.

Optionally, the parameter exchange response further includes the protection rule of the service request selected by the pSEPP, and the like.

S813: The cSEPP receives the parameter exchange response.

S814: The cSEPP generates a second N32-f context based on the parameter exchange response, where the second N32-f context includes the second N32-f context identifier and the second PLMN identifier.

S815: The cSEPP establishes and stores a third mapping relationship among the first N32-f context identifier, the first PLMN identifier, and the second N32-f context and/or the second N32-f context identifier.

Implementation of the third mapping relationship is similar to implementation of the second mapping relationship. Details are not repeated for brevity.

Third Phase: Service Request Phase.

Figure 9:
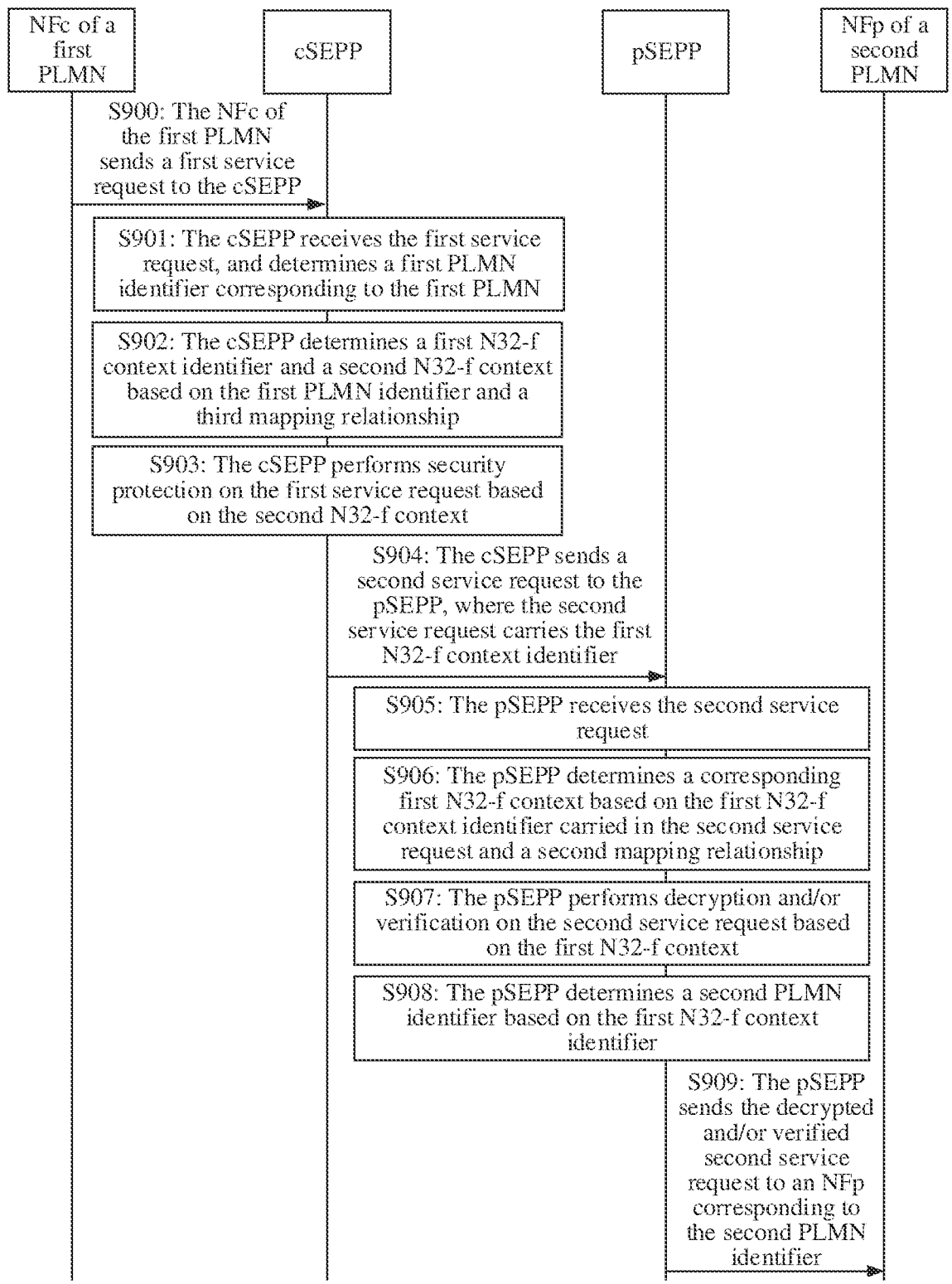
FIG. 9 is a schematic flowchart of a third phase of a first signaling protection method according to an example embodiment.

Specifically, as shown in FIG. 9, steps in a third phase of the signaling protection method according to an embodiment are as follows:

S900: An NFc of the first PLMN sends a first service request to a cSEPP.

Optionally, the first service request includes the first PLMN identifier.

S901: The cSEPP receives the first service request, and determines the first PLMN identifier corresponding to the first PLMN.

In an optional manner in this embodiment, when the first service request includes the first PLMN identifier, the cSEPP may determine the first PLMN identifier based on the first service request.

In another optional manner in this embodiment, the cSEPP may determine the first PLMN identifier based on transport layer information.

For example, the NFc of the first PLMN establishes a transport layer link to the cSEPP. Therefore, the cSEPP may determine the first PLMN ID by using some or all information such as an IP address, a port number, a domain name, and a certificate.

S902: The cSEPP determines the first N32-f context identifier and the second N32-f context based on the first PLMN identifier and the third mapping relationship.

S903: The cSEPP performs security protection on the first service request based on the second N32-f context.

S904: The cSEPP sends a second service request to the pSEPP, where the second service request carries the first N32-f context identifier.

The second service request is obtained after the cSEPP protects the first service request and adjusts a format.

S905: The pSEPP receives the second service request.

S906: The pSEPP determines a corresponding first N32-f context based on the first N32-f context identifier carried in the second service request, and the second mapping relationship.

S907: The pSEPP performs decryption and/or verification on the second service request based on the first N32-f context.

S908: The pSEPP determines the second PLMN identifier based on the first N32-f context identifier.

S909: The pSEPP sends the decrypted and/or verified second service request to an NFp corresponding to the second PLMN identifier.

When the first request is the capability negotiation request in this embodiment, content of the first phase and steps S800 to S804 in the second phase in this embodiment may be integrated.

Figure 10:
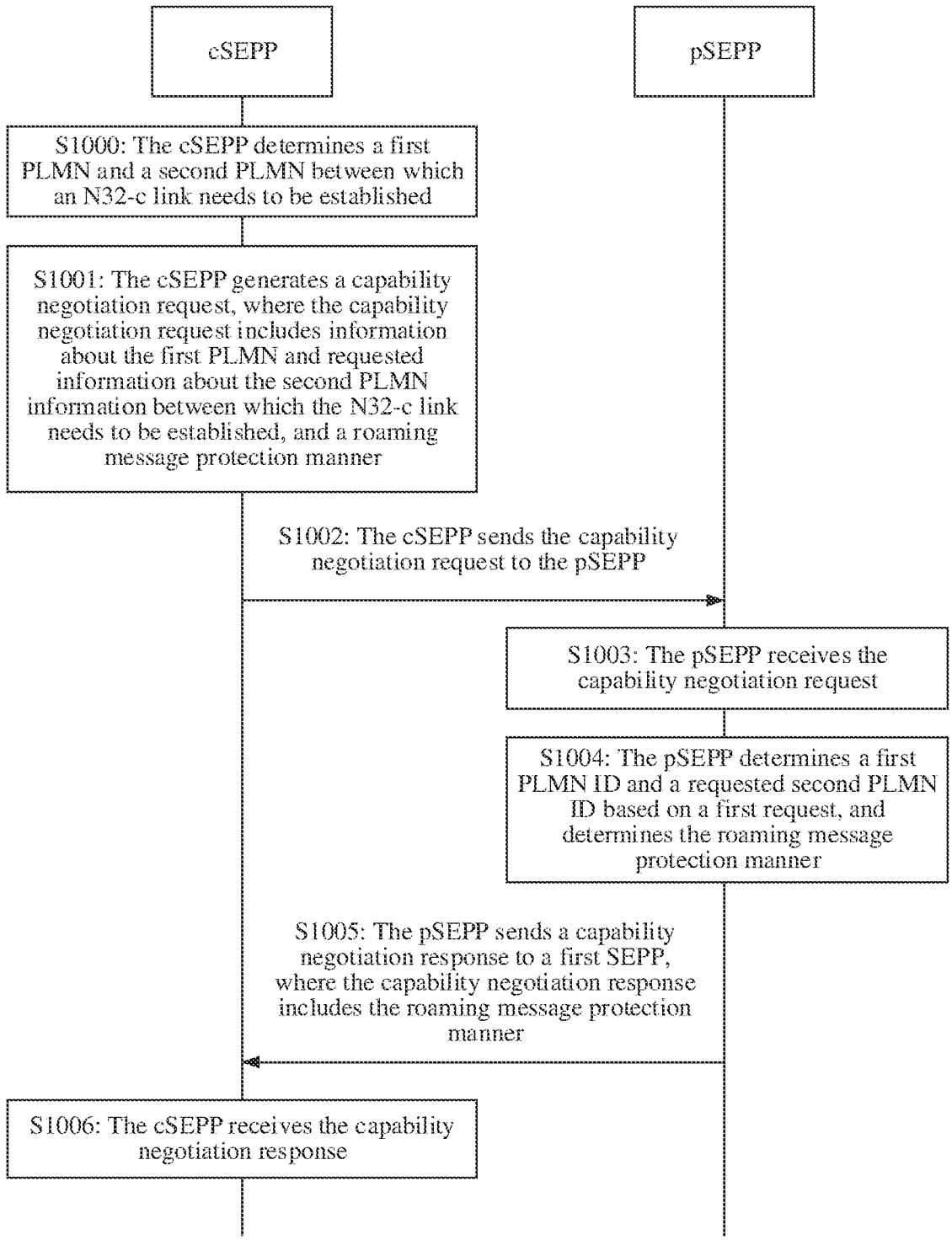
FIG. 10 is a schematic flowchart of establishing an N32-c link by using a capability negotiation request according to an example embodiment.

For example, assuming that the first request is the capability negotiation request, steps obtained by integrating steps are shown in FIG. 6 in the first phase and steps S800 to S804 are shown in FIG. 10.

S1000: The cSEPP determines a first PLMN and a second PLMN between which an N32-c link needs to be established.

S1001: The cSEPP generates a capability negotiation request, where the capability negotiation request includes information about the first PLMN and requested information about the second PLMN between which the N32-c link needs to be established, and a roaming message protection manner.

S1002: The cSEPP sends the capability negotiation request to the pSEPP.

S1003: The pSEPP receives the capability negotiation request.

S1004: The pSEPP determines a first PLMN ID and a requested second PLMN ID based on the first request, and determines the roaming message protection manner.

S1005: The pSEPP sends a capability negotiation response to a first SEPP, where the capability negotiation response includes the roaming message protection manner.

S1006: The cSEPP receives the capability negotiation response.

For steps obtained by integrating steps shown in FIG. 7 in the first phase and steps S800 to S804 in this embodiment, refer to FIG. 10. For brief description, details are not repeated for brevity.

Further, based on the scenario 1, in this embodiment, there are a plurality of cases of mapping relationships established by the cSEPP and mapping relationships established by the pSEPP. The cases are not specifically limited to the following types.

Case 1 of the Mapping Relationships Established by the cSEPP:

The cSEPP or a third-party storage device accessible by the cSEPP stores at least one of the following mapping relationship tables.

TABLE 1

| First N32-f context identifier | First PLMN identifier |
| --- | --- |

TABLE 2

| PLMN pair | |
| --- | --- |
| First PLMN identifier | Second PLMN identifier |

TABLE 3

| First N32-f context identifier | Second N32-f context |
| --- | --- |

Therefore, after receiving a service request from the first PLMN, the cSEPP may determine, based on the first PLMN identifier and content in Tables 1 to 3, the first N32-f context identifier, the second N32-f context, and the like that correspond to the first PLMN identifier.

Case 2 of the Mapping Relationships Established by the cSEPP:

After performing S605, the cSEPP establishes the mapping relationship table in Table 1.

The cSEPP extends the mapping relationship in Table 1 based on the PLMN pair. An extended Table 1 is as follows:

| First N32-f context identifier | First PLMN identifier | Second PLMN identifier |
| --- | --- | --- |

When performing S615, the cSEPP continues to extend Table 1. The extended Table 1 is as follows:

| First N32-f context identifier | Second N32-f context identifier | Second N32-f context | First PLMN identifier | Second PLMN identifier |
| --- | --- | --- | --- | --- |

Therefore, after receiving the first service request from the first PLMN, the cSEPP may determine, based on the first PLMN identifier and content in Table 1, the first N32-f context identifier, the second N32-f context, and the like that correspond to the first PLMN identifier.

Case 3 of the Mapping Relationships Established by the cSEPP:

After the cSEPP generates the second N32-f context based on the second N32-f context identifier, the first SEPP adds the PLMN pair and the first N32-f context identifier to the second N32-f context.

Figure 11:
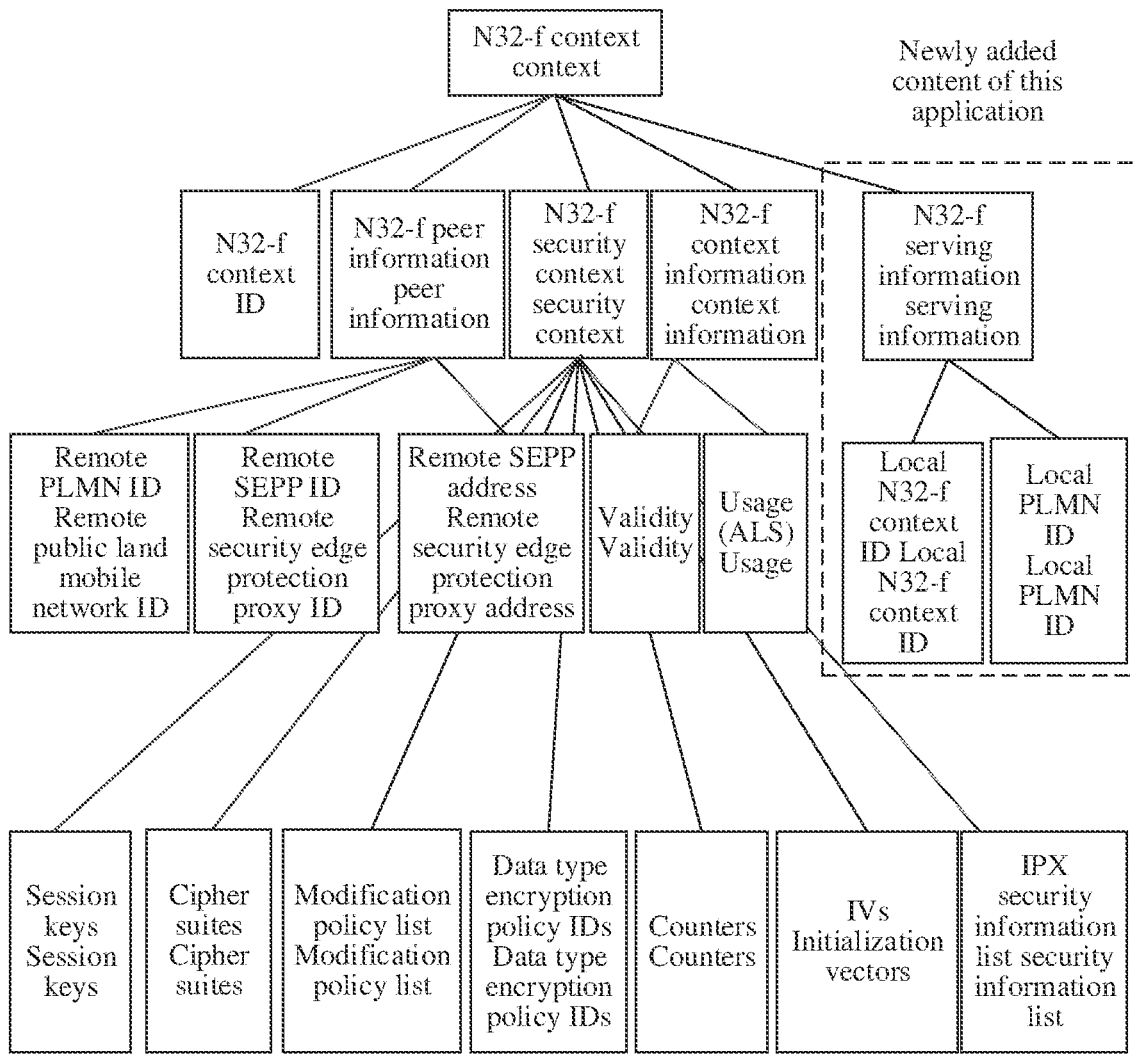
FIG. 11 is a schematic diagram of content of an N32-f context according to an example embodiment.

In an optional manner in this embodiment, after information used to determine the mapping relationships is added to the N32-f context, content of the N32-f context may be shown in FIG. 11.

Case 1 of the Mapping Relationships Established by the pSEPP:

The pSEPP or a third-party storage device accessible by the pSEPP stores at least one mapping relationship table.

TABLE 4

| Second N32-f context identifier | Second PLMN identifier |
| --- | --- |

TABLE 5

| PLMN pair | |
| --- | --- |
| First PLMN identifier | Second PLMN identifier |

TABLE 6

| Second N32-f context identifier | First N32-f context |
| --- | --- |

Therefore, after receiving a service request from the cSEPP, the pSEPP may determine, based on the first N32-f context identifier in the service request and content in Tables 4 to 6, the second PLMN for forwarding.

Case 2 of the Mapping Relationships Established by the pSEPP:

After performing S611, the pSEPP establishes the mapping relationship table in Table 4.

The pSEPP extends the mapping relationship in Table 4 based on the PLMN pair. An extended Table 4 is as follows:

| Second N32-f context identifier | First PLMN identifier | Second PLMN identifier |
| --- | --- | --- |

After generating the first N32-f context corresponding to the first N32-f context identifier, the pSEPP continues to extend Table 4. An extended Table 4 is as follows:

| First N32-f context identifier | Second N32-f context identifier | Second N32-f context | First PLMN identifier | Second PLMN identifier |
| --- | --- | --- | --- | --- |

Therefore, after receiving a service request from the cSEPP, the pSEPP may determine, based on the first N32-f context identifier in the service request and content in Table 4, the second PLMN for forwarding.

Case 3 of the Mapping Relationships Established by the pSEPP:

After the pSEPP generates the first N32-f context based on the first N32-f context identifier, the pSEPP adds the PLMN pair and the second N32-f context identifier to the first N32-f context.

In an optional manner in this embodiment, after information used to determine the mapping relationships is added to the N32-f context, content of the N32-f context may be shown in FIG. 11.

Scenario 2: PLMNs Share Both an N32-c and N32-f.

The scenario 2 may be understood as follows: A first SEPP (a cSEPP) and a second SEPP (a pSEPP) enable each pair of PLMNs for roaming services to be based on a same N32-f link and a same N32-c link.

An execution process of the signaling protection method may be divided into three phases.

First Phase: Establish a Shared N32-c link.

Figure 12:
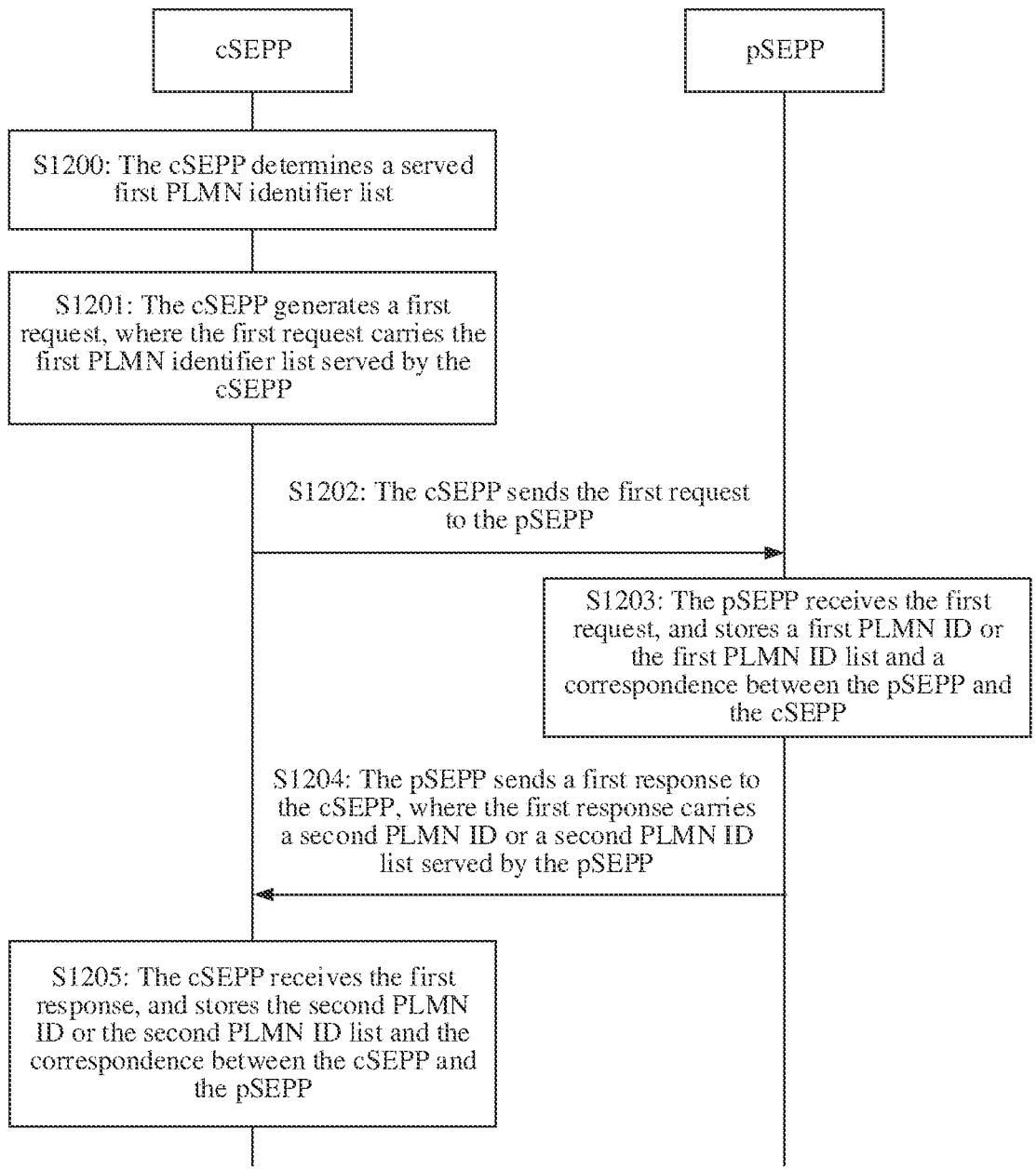
FIG. 12 is a schematic flowchart of a first phase of a third signaling protection method according to an example embodiment.

Specifically, as shown in FIG. 12, steps in a first phase of a signaling protection method according to an embodiment are as follows:

S1200: The cSEPP determines a served first PLMN identifier list.

It should be noted that in this embodiment an example embodiment, there may be one or more first PLMN identifiers in the first PLMN identifier list. When the first PLMN identifier list includes only one PLMN identifier, the cSEPP may determine a served first PLMN identifier.

For example, assuming that PLMNs corresponding to the cSEPP are a PLMN 1 and a PLMN 3, a first PLMN identifier set corresponding to the cSEPP includes the PLMN 1 and a PLMN 2.

S1201: The cSEPP generates a first request, where the first request carries the first PLMN identifier list served by the cSEPP.

In an optional manner in this embodiment, the first request may be a capability negotiation request, an N32-c setup request, or a roaming PLMN ID pair negotiation request. This is not specifically limited herein.

S1202: The cSEPP sends the first request to the pSEPP.

S1203: The pSEPP receives the first request, and stores a first PLMN ID or the first PLMN ID list and a correspondence between the pSEPP and the cSEPP.

S1204: The pSEPP sends a first response to the cSEPP, where the first response carries a second PLMN ID or a second PLMN ID list served by the pSEPP.

S1205: The cSEPP receives the first response, and stores the second PLMN ID or the second PLMN ID list, and the correspondence between the cSEPP and the pSEPP.

Based on the foregoing steps, the cSEPP and the pSEPP may be enabled to mutually obtain a PLMN ID or a PLMN ID list of a peer service.

Second Phase: Negotiation and Mapping Establishment Phase.

Figure 13:
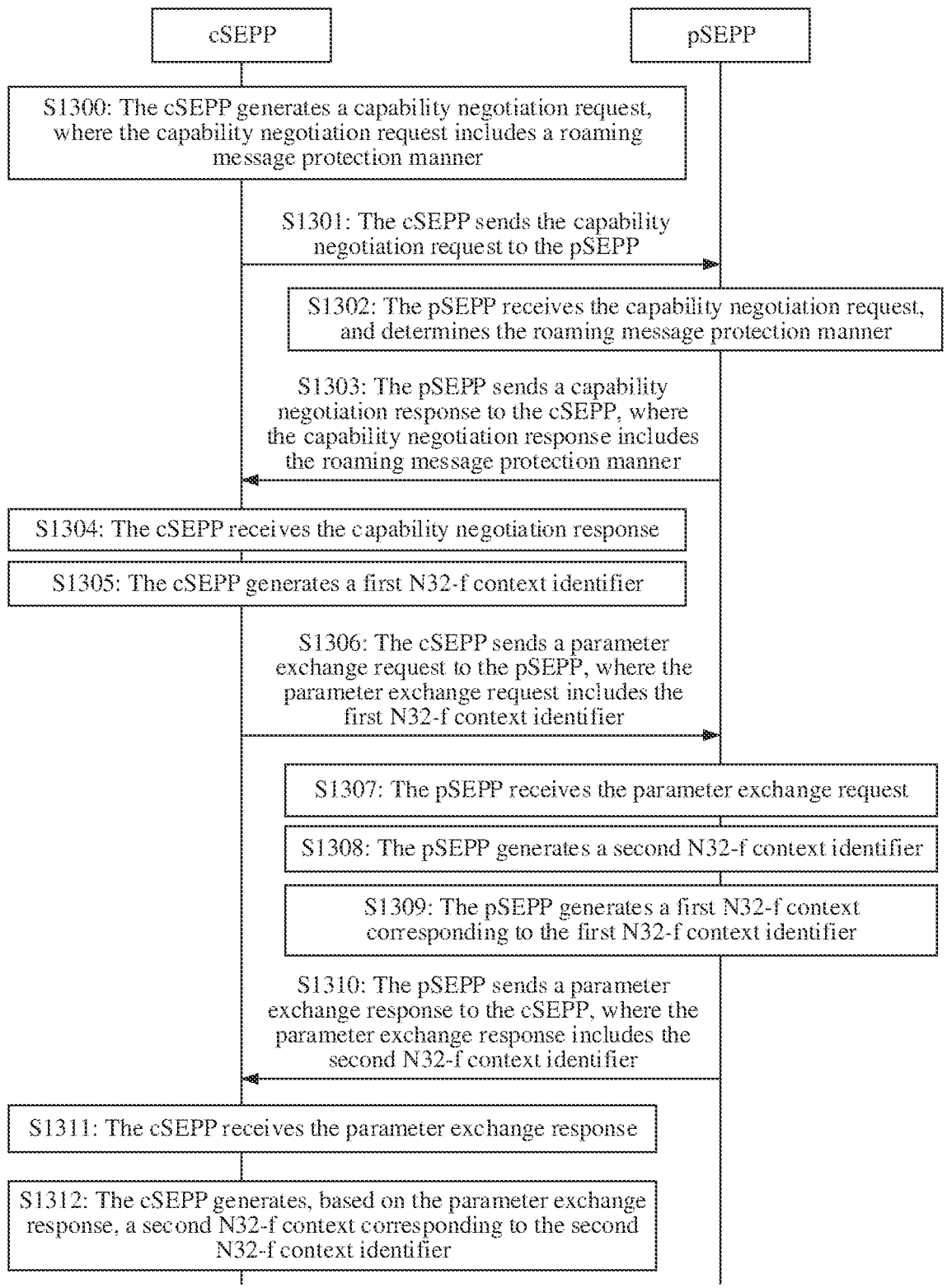
FIG. 13 is a schematic flowchart of a second phase of a second signaling protection method according to an example embodiment.

Specifically, as shown in FIG. 13, steps in a second phase of the signaling protection method according to an embodiment are as follows:

S1300: The cSEPP generates a capability negotiation request, where the capability negotiation request includes a roaming message protection manner.

The roaming message protection manner may be, for example, a PRINS or a TLS. This is not limited herein.

S1301: The cSEPP sends the capability negotiation request to the pSEPP.

S1302: The pSEPP receives the capability negotiation request, and determines the roaming message protection manner.

S1303: The pSEPP sends a capability negotiation response to the cSEPP, where the capability negotiation response includes the roaming message protection manner.

S1304: The cSEPP receives the capability negotiation response.

S1305: The cSEPP generates a first N32-f context identifier.

S1306: The cSEPP sends a parameter exchange request to the pSEPP, where the parameter exchange request includes the first N32-f context identifier.

Optionally, the parameter exchange request further includes the roaming message protection manner, and the like.

S1307: The pSEPP receives the parameter exchange request.

S1308: The pSEPP generates a second N32-f context identifier based on the parameter exchange request.

S1309: The pSEPP generates a first N32-f context corresponding to the first N32-f context identifier.

Optionally, the pSEPP stores a mapping relationship between a second PLMN identifier list and a first PLMN identifier list.

Optionally, the pSEPP may store the first PLMN identifier list in the first N32-f context. Alternatively, the pSEPP may store the mapping relationship between the second PLMN identifier list and the first PLMN identifier list in the first N32-f context.

S1310: The pSEPP sends a parameter exchange response to the cSEPP, where the parameter exchange response includes the second N32-f context identifier.

Optionally, the parameter exchange response further includes a protection rule of a service request selected by the pSEPP, and the like.

S1311: The cSEPP receives the parameter exchange response.

S1312: The cSEPP generates, based on the parameter exchange response, the second N32-f context corresponding to the second N32-f context identifier.

When the first request in this embodiment is the capability negotiation request, content of the first phase in this embodiment and steps S1300 to S1304 in the second phase may be integrated. For integrated steps, refer to FIG. 10. For brief description, details are not repeated.

Third Phase: Service Request Phase.

Figure 14:
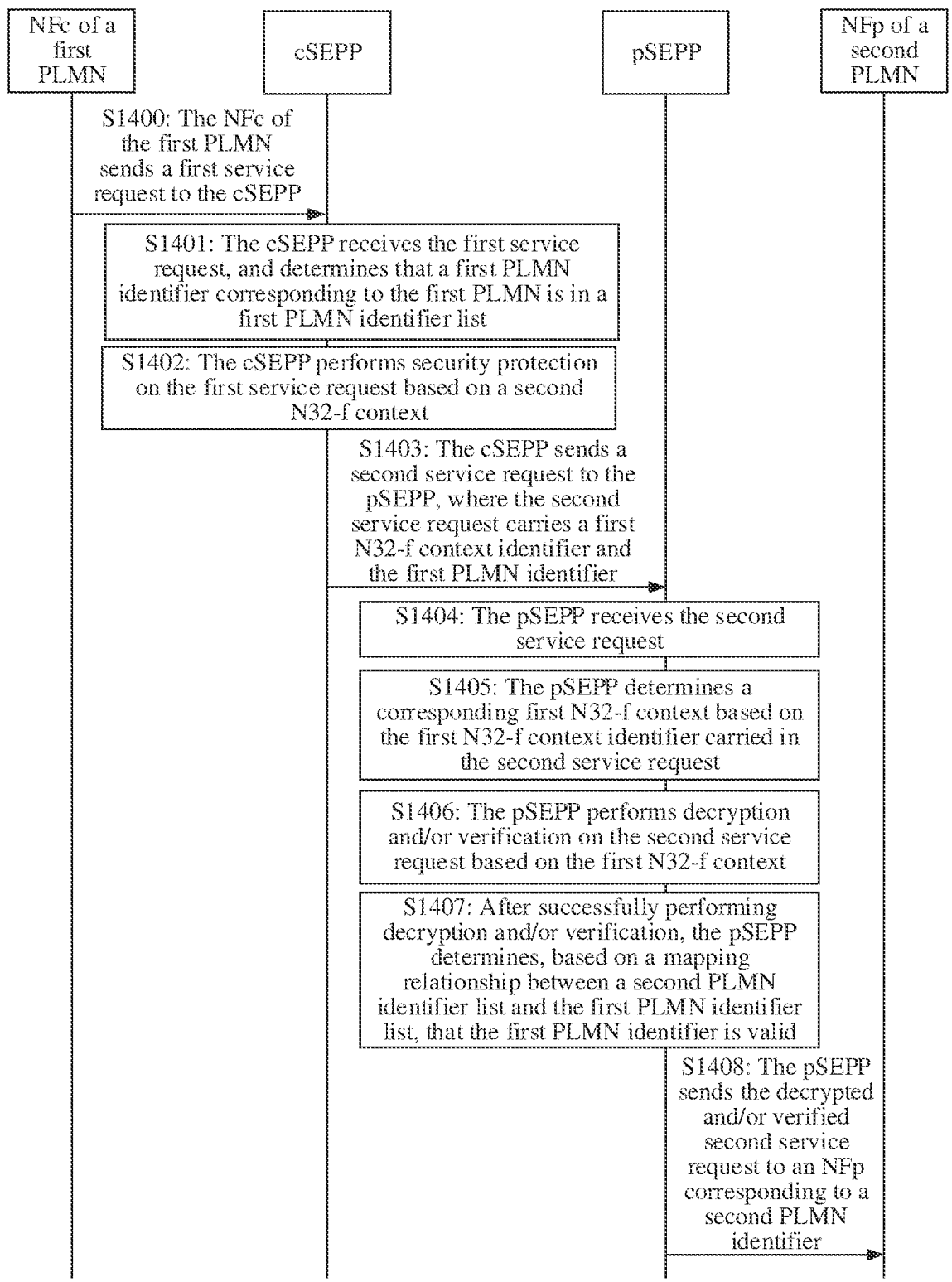
FIG. 14 is a schematic flowchart of a third phase of a second signaling protection method according to an example embodiment.

Specifically, as shown in FIG. 14, steps in a third phase of the signaling protection method according to an embodiment are as follows:

S1400: An NFc of the first PLMN sends a first service request to the cSEPP.

Optionally, the first service request includes the first PLMN identifier.

S1401: The cSEPP receives the first service request, and determines that the first PLMN identifier corresponding to the first PLMN is in the first PLMN identifier list.

Optionally, if the cSEPP determines that the first PLMN identifier corresponding to the first PLMN is not in the first PLMN identifier list, the cSEPP returns error information to the NFc.

S1402: The cSEPP performs security protection on the first service request based on the second N32-f context.

S1403: The cSEPP sends a second service request to the pSEPP, where the second service request carries the first N32-f context identifier and the first PLMN identifier.

The second service request is obtained after the cSEPP protects the first service request and adjusts a format.

S1404: The pSEPP receives the second service request.

S1405: The pSEPP determines the corresponding first N32-f context based on the first N32-f context identifier carried in the second service request.

S1406: The pSEPP performs decryption and/or verification on the second service request based on the first N32-f context.

S1407: After successfully performing decryption and/or verification, the pSEPP determines, based on a mapping relationship between a second PLMN identifier list and the first PLMN identifier list, that the first PLMN identifier is valid.

Optionally, if determining that the first PLMN identifier exists in the mapping relationship, the pSEPP determines that the PLMN identifier is valid.

Optionally, when the first N32-f context stores the first PLMN list, the pSEPP may determine whether the first PLMN identifier is in the first N32-f context. If the first PLMN identifier is in the first N32-f context, the first PLMN identifier is valid.

Further, if determining that the first PLMN identifier is invalid, the pSEPP feeds back error information to the cSEPP.

S1408: The pSEPP sends the decrypted and/or verified second service request to an NFp corresponding to the second PLMN identifier.

Scenario 3: PLMNs Share Only an N32-c.

The scenario 3 may be understood as follows: A first SEPP (a cSEPP) and a second SEPP (a pSEPP) share one N32-c link for each pair of PLMNs for roaming services.

An execution process of the signaling protection method may be divided into three phases.

First Phase: Establish a Shared N32-c Link.

In this embodiment, for content of the first phase, refer to descriptions of the first phase in the scenario 2. For brief description, details are not repeated.

Second Phase: Capability Negotiation and Security Context Establishment Phase.

Figure 15A:
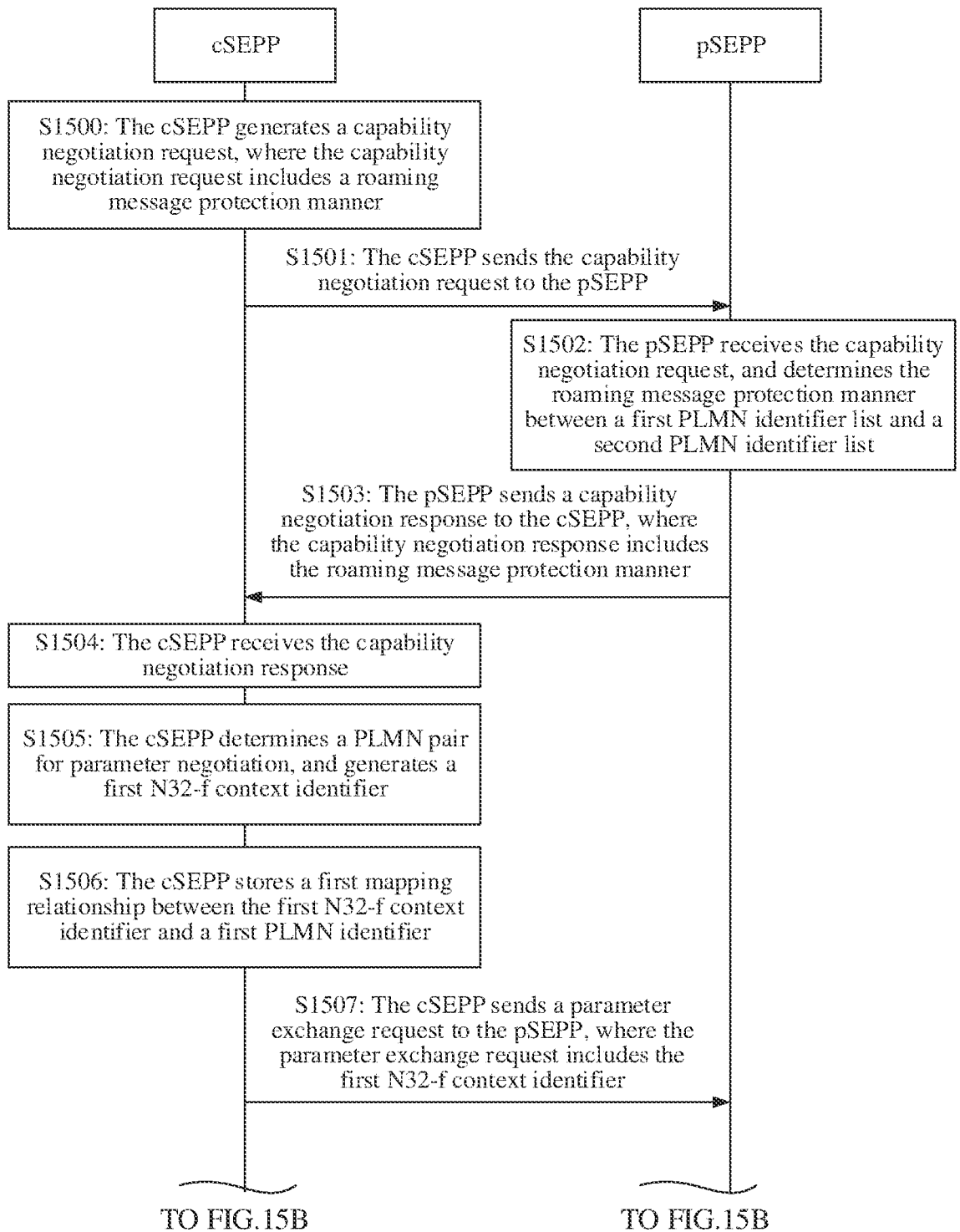
FIG. 15A and FIG. 15B are a schematic flowchart of a second phase of a third signaling protection method according to an example embodiment.
Figure 15B:
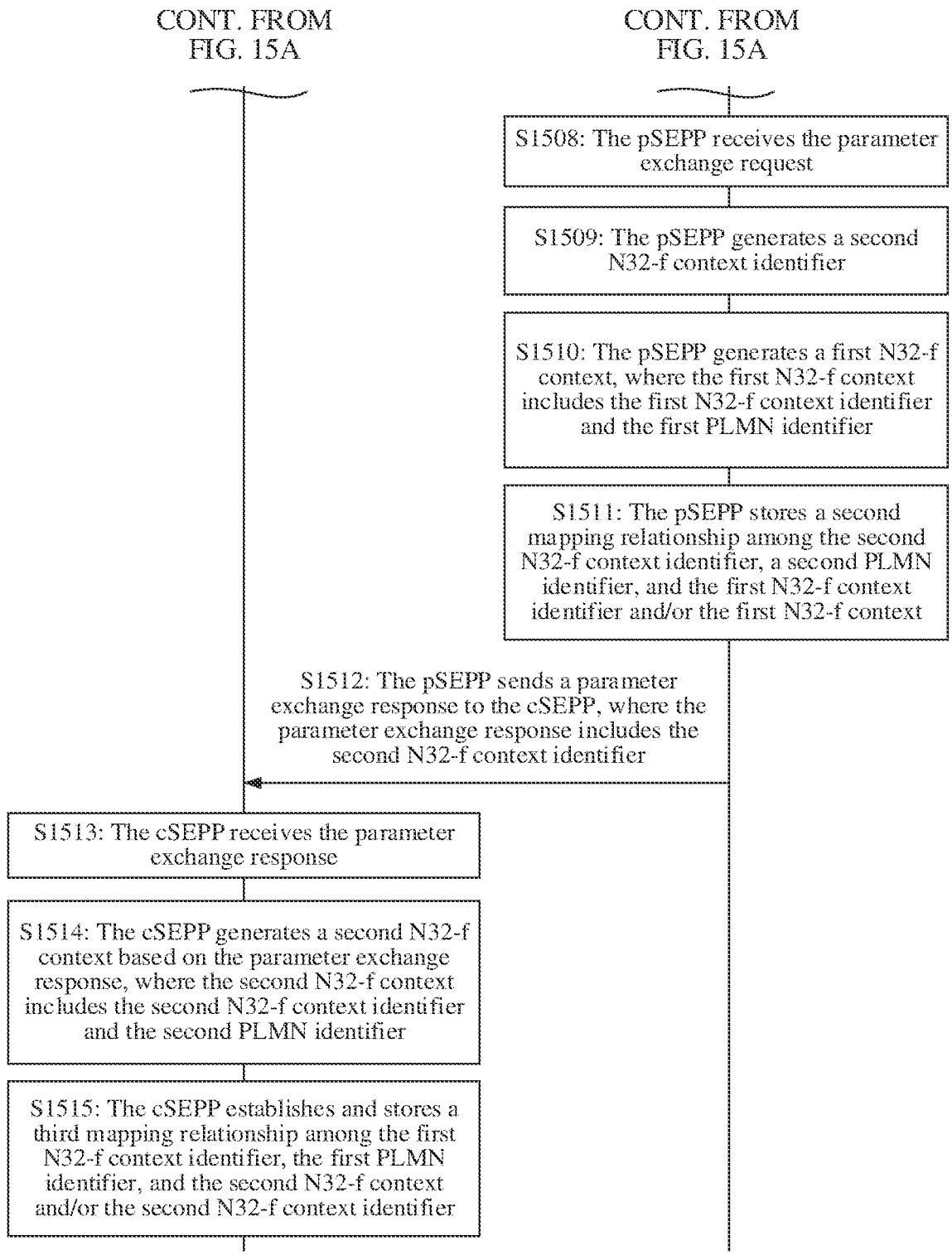

Specifically, as shown in FIG. 15A and FIG. 15B, steps in a second phase of the signaling protection method according to an embodiment are as follows:

S1500: The cSEPP generates a capability negotiation request, where the capability negotiation request includes a roaming message protection manner.

In an optional manner in this embodiment, the roaming message protection manner may be a PRINS or a TLS. This is not limited herein.

S1501: The cSEPP sends the capability negotiation request to the pSEPP.

S1502: The pSEPP receives the capability negotiation request, and determines the roaming message protection manner between a first PLMN identifier list and a second PLMN identifier list.

S1503: The pSEPP sends a capability negotiation response to the cSEPP, where the capability negotiation response includes the roaming message protection manner.

S1504: The cSEPP receives the capability negotiation response.

In an optional manner, the foregoing procedure may alternatively be: The first SEPP determines a PLMN pair that performs capability negotiation through the second SEPP, that is, determines a first PLMN identifier and a second PLMN identifier, and the first SEPP carries the first PLMN identifier and the second PLMN identifier in the capability negotiation request. The second SEPP determines the roaming message protection manner between the first PLMN identifier and the second PLMN identifier. In this way, the first SEPP and the second SEPP may alternatively determine a used protection manner.

S1505: The cSEPP determines a PLMN pair for parameter negotiation, and generates a first N32-f context identifier.

In other words, the cSEPP determines the first PLMN identifier and the second PLMN identifier, and generates the first N32-f context identifier.

S1506: The cSEPP stores a first mapping relationship between the first N32-f context identifier and the first PLMN identifier.

Optionally, the cSEPP may locally store the first mapping relationship between the first N32-f context identifier and the first PLMN identifier, or store the first mapping relationship in a third-party device that can be accessed by the cSEPP.

S1507: The cSEPP sends a parameter exchange request to the pSEPP, where the parameter exchange request includes the first N32-f context identifier.

Optionally, the parameter exchange request further includes a protection rule of a service request, and the like.

S1508: The pSEPP receives the parameter exchange request.

S1509: The pSEPP generates a second N32-f context identifier.

S1510: The pSEPP generates a first N32-f context, where the first N32-f context includes the first N32-f context identifier and the first PLMN identifier.

S1511: The pSEPP stores a second mapping relationship among the second N32-f context identifier, a second PLMN identifier, and the first N32-f context identifier and/or the first N32-f context.

In an optional manner in this embodiment, after performing step S1510, the pSEPP establishes and stores a mapping relationship between the second N32-f context identifier and the second PLMN identifier.

Then, after performing step S1511, the pSEPP establishes a mapping relationship between the second N32-f context identifier and the first N32-f context.

An optional implementation of the second mapping relationship is storing the second PLMN identifier and/or the second N32-f context identifier in the first N32-f context.

It should be noted that the second mapping relationship may be indirectly determined, or may be directly determined.

S1512: The pSEPP sends a parameter exchange response to the cSEPP, where the parameter exchange response includes the second N32-f context identifier.

Optionally, the parameter exchange response further includes protection rule of the service request selected by the pSEPP, and the like.

S1513: The cSEPP receives the parameter exchange response.

S1514: The cSEPP generates a second N32-f context based on the parameter exchange response, where the second N32-f context includes the second N32-f context identifier and the second PLMN identifier.

S1515: The cSEPP establishes and stores a third mapping relationship among the first N32-f context identifier, the first PLMN identifier, and the second N32-f context and/or the second N32-f context identifier.

Implementation of the third mapping relationship is similar to implementation of the second mapping relationship. Details are not repeated for brevity.

When the first request in this embodiment is the capability negotiation request, content of the first phase in this embodiment and steps S1300 to S1304 in the second phase may be integrated. For integrated steps, refer to FIG. 10. For brief description, details are not repeated.

Third Phase: Service Request Phase.

Figure 16:
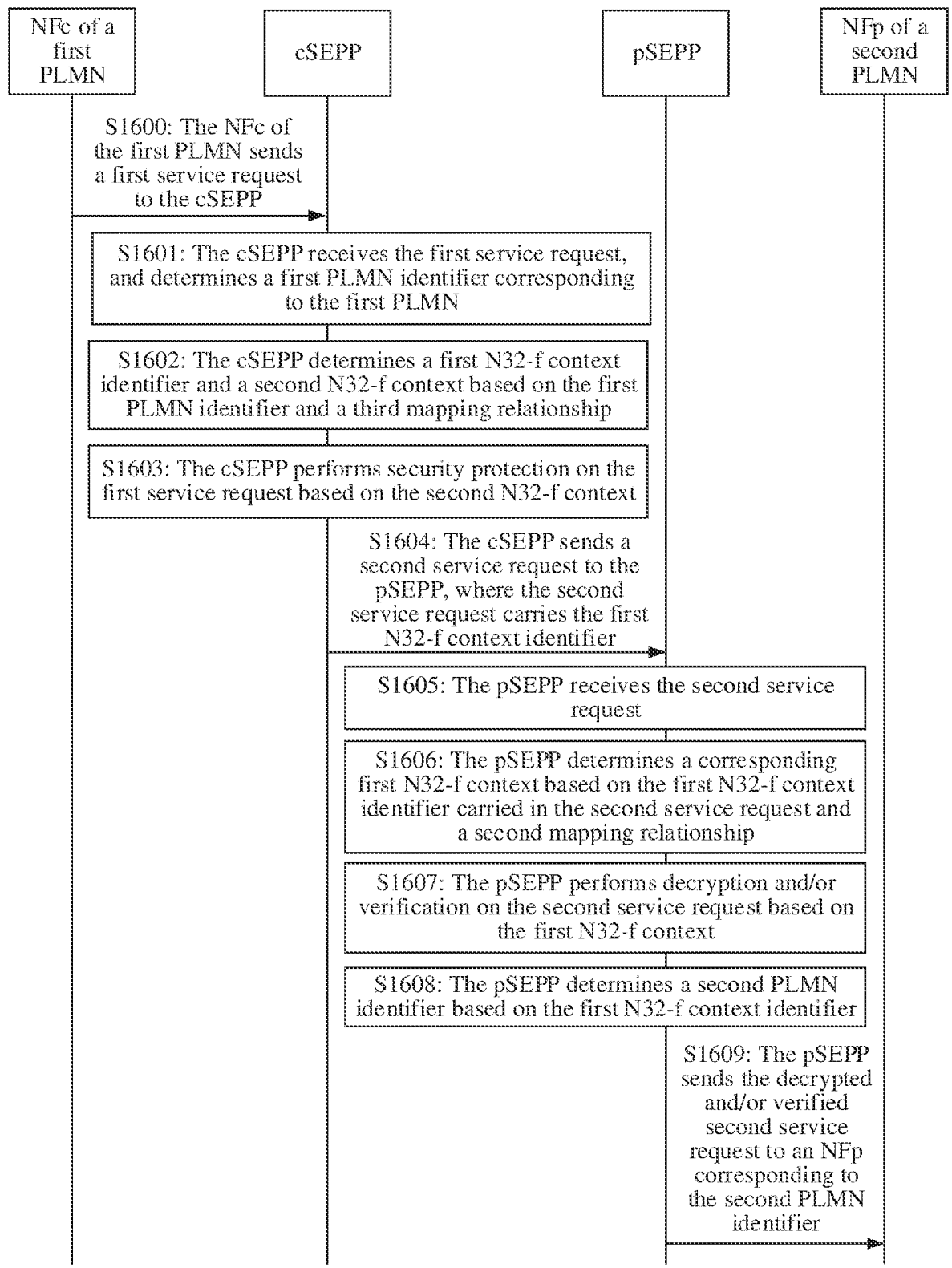
FIG. 16 is a schematic flowchart of a third phase of a third signaling protection method according to an example embodiment.

Specifically, as shown in FIG. 16, steps in a third phase of the signaling protection method according to an embodiment are as follows:

S1600: An NFc of the first PLMN sends a first service request to the cSEPP.

Optionally, the first service request includes the first PLMN identifier.

S1601: The cSEPP receives the first service request, and determines the first PLMN identifier corresponding to the first PLMN.

In an optional manner in this embodiment, when the first service request includes the first PLMN identifier, the cSEPP may determine the first PLMN identifier based on the first service request.

In another optional manner in this embodiment, the cSEPP may determine the first PLMN identifier based on transport layer information.

For example, the NFc of the first PLMN establishes a transport layer link to the cSEPP. Therefore, the cSEPP may determine the first PLMN ID by using some or all information such as an IP address, a port number, a domain name, and a certificate.

S1602: The cSEPP determines the first N32-f context identifier and the second N32-f context based on the first PLMN identifier and the third mapping relationship.

S1603: The cSEPP performs security protection on the first service request based on the second N32-f context.

S1604: The cSEPP sends a second service request to the pSEPP, where the second service request carries the first N32-f context identifier.

The second service request is obtained after the cSEPP protects the first service request and adjusts a format.

S1605: The pSEPP receives the second service request.

S1606: The pSEPP determines the corresponding first N32-f context based on the first N32-f context identifier carried in the second service request, and the second mapping relationship.

S1607: The pSEPP performs decryption and/or verification on the second service request based on the first N32-f context.

S1608: The pSEPP determines the second PLMN identifier based on the first N32-f context identifier.

S1609: The pSEPP sends the decrypted and/or verified second service request to an NFp corresponding to the second PLMN identifier.

For mapping relationships in the scenario 3, refer to descriptions in the scenario 1. For brief description, details are not repeated.

Architecture 2: As shown in the system architecture in FIG. 4, there is an intermediate node, that is, the third device between the first device and the second device.

In the current system architecture 2, there are a plurality of application scenarios in which the signaling protection method is performed in this embodiment, and the application scenarios are not specifically limited to the following cases.

Scenario 1: PLMNs Shares Neither an N32-c nor N32-f.

The scenario 1 may be understood as follows: There is a third-party forwarding device, that is, a third SEPP (an ISEPP), between a first SEPP (a cSEPP) and a second SEPP (a pSEPP); and the first SEPP and the second SEPP generate one N32-c link and one N32-f link for each pair of PLMNs for roaming services.

An execution process of the signaling protection method may be divided into three phases.

First Phase: An Independent N32-c Link is Established for Each Pair of PLMNs for Roaming Services.

Figure 17:
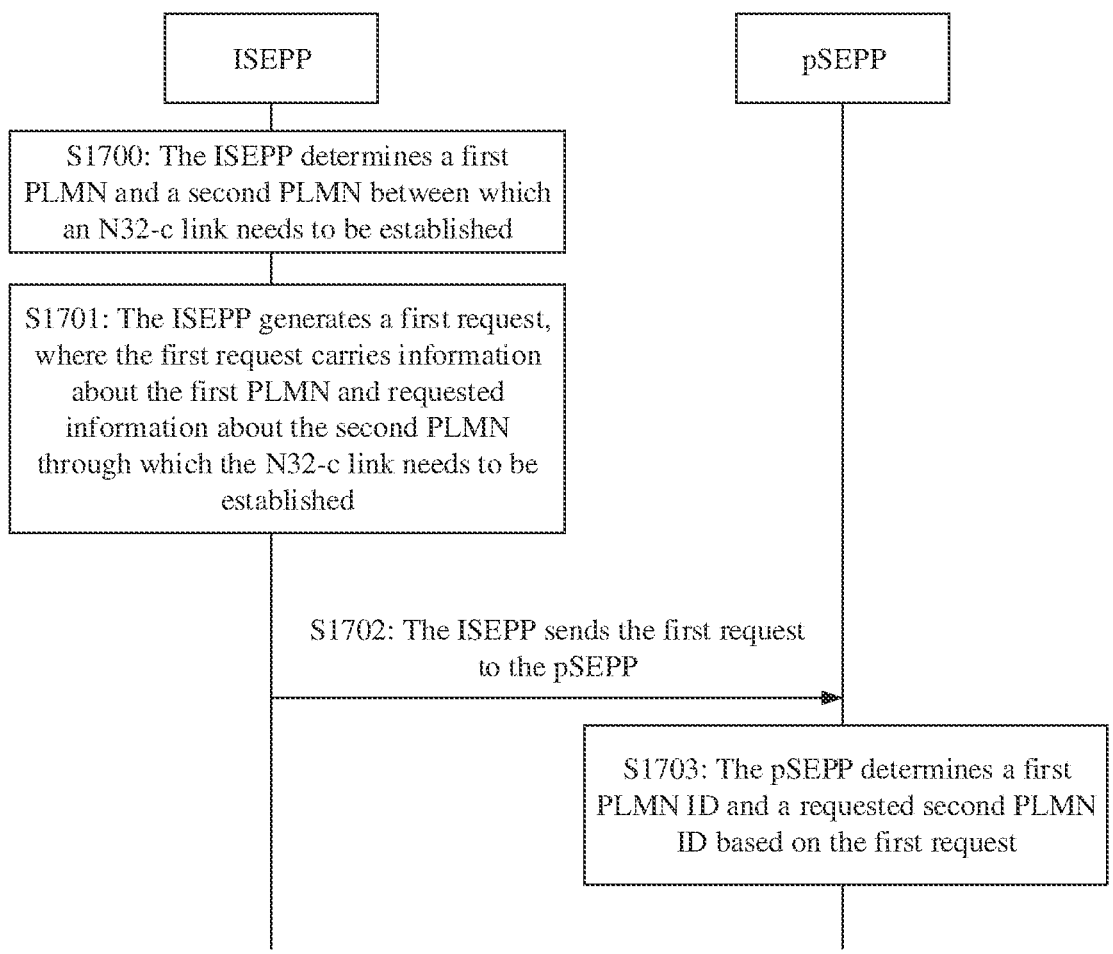
FIG. 17 is a schematic flowchart of a first phase of a fourth signaling protection method according to an example embodiment.

Specifically, as shown in FIG. 17, steps in a first phase of a signaling protection method according to an embodiment are as follows:

S1700: The ISEPP determines a first PLMN and a second PLMN between which an N32-c link needs to be established.

S1701: The ISEPP generates a first request, where the first request carries information about the first PLMN and requested information about the second PLMN between which the N32-c link needs to be established.

The first request may be a link request or a TLS request. This is not specifically limited herein.

Optionally, the information about the first PLMN includes but is not limited to some or all of the following:

an IP, a port number, a domain name, and a certificate that correspond to the first PLMN.

The information about the second PLMN includes but is not limited to some or all of the following:

an IP, a port number, a domain name, and a certificate that correspond to the second PLMN.

S1702: The ISEPP sends the first request to the pSEPP.

S1703: The pSEPP determines a first PLMN ID and a requested second PLMN ID based on the first request.

Optionally, the pSEPP determines the first PLMN based on the information about the first PLMN carried in the first request, and determines the second PLMN based on the information about the second PLMN carried in the first request.

Further, after determining the first PLMN and the second PLMN between which the N32-c link needs to be established, the ISEPP may store a mapping relationship between the link and a PLMN ID pair. After determining the first PLMN and the second PLMN based on the N32-c link, the pSEPP may store the mapping relationship between the link and the PLMN ID pair.

Based on the foregoing steps in this embodiment, the ISEPP and the pSEPP determine that the PLMN ID pair for roaming services on the N32-c link is the first PLMN and the second PLMN.

Figure 18:
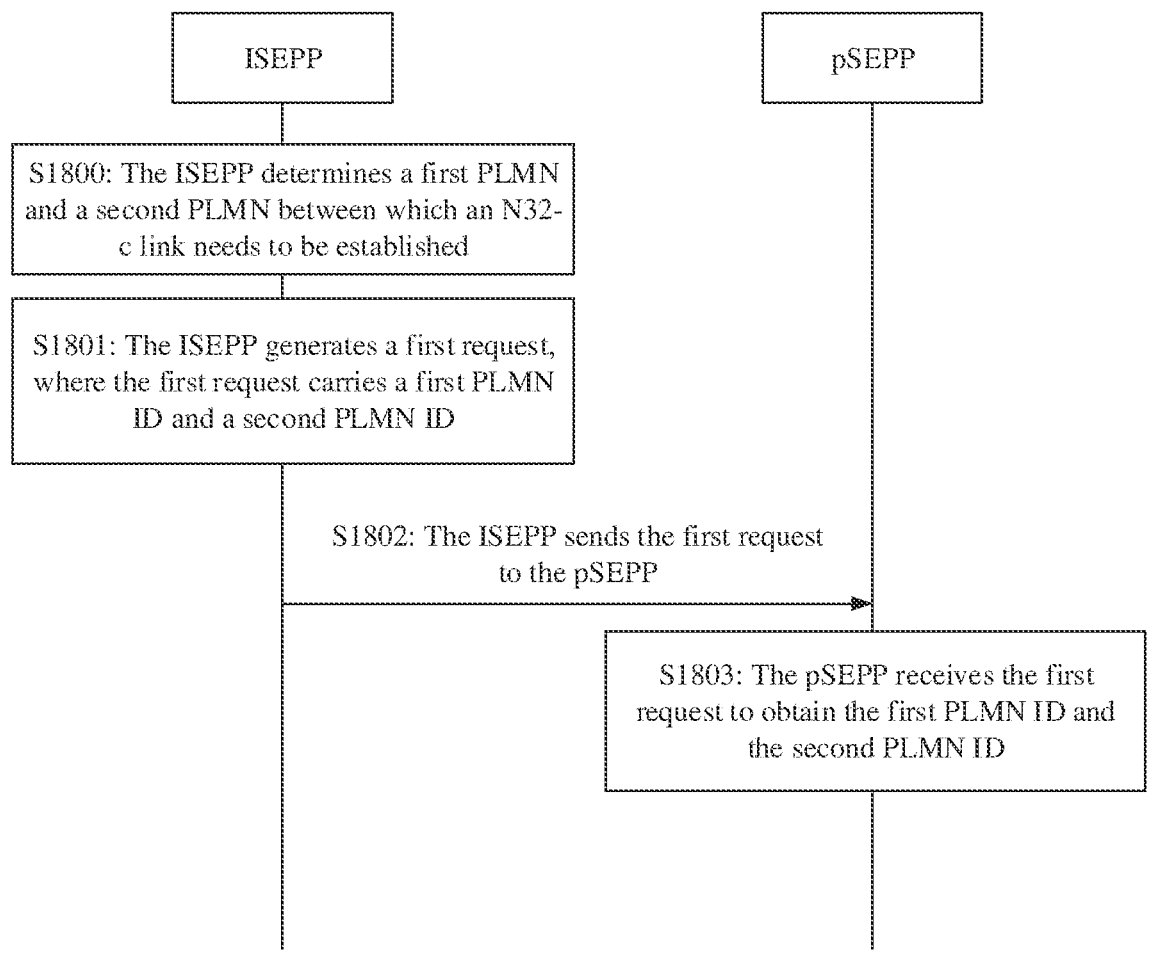
FIG. 18 is a schematic flowchart of a first phase of a fifth signaling protection method according to an example embodiment.

Specifically, as shown in FIG. 18, steps in a first phase of another signaling protection method according to an embodiment are as follows:

S1800: The ISEPP determines a first PLMN and a second PLMN between which an N32-c link needs to be established.

S1801: The ISEPP generates a first request, where the first request carries a first PLMN ID and a second PLMN ID.

The first request may be a capability negotiation request, an N32-c setup request, or a roaming PLMN ID pair negotiation request. This is not specifically limited herein.

S1802: The ISEPP sends the first request to the pSEPP.

S1803: The pSEPP receives the first request, to obtain the first PLMN ID and the second PLMN ID.

Further, after determining the first PLMN and the second PLMN between which a first link needs to be established, the ISEPP may store a mapping relationship between the link and a PLMN ID pair. After determining the first PLMN and the second PLMN based on the first link, the pSEPP may store the mapping relationship between the link and the PLMN ID pair.

Based on the foregoing steps in this embodiment, the ISEPP and the pSEPP determine that the PLMN ID pair for roaming services on the N32-c link is the first PLMN and the second PLMN.

Second Phase: Capability Negotiation and Security Context Establishment Phase.

The third SEPP and the second SEPP perform capability negotiation and security context establishment on the foregoing established N32-c link. Because the link exclusively belongs to the first PLMN and the second PLMN, a negotiated capability and a security context correspond to the first PLMN and the second PLMN.

Figure 19A:
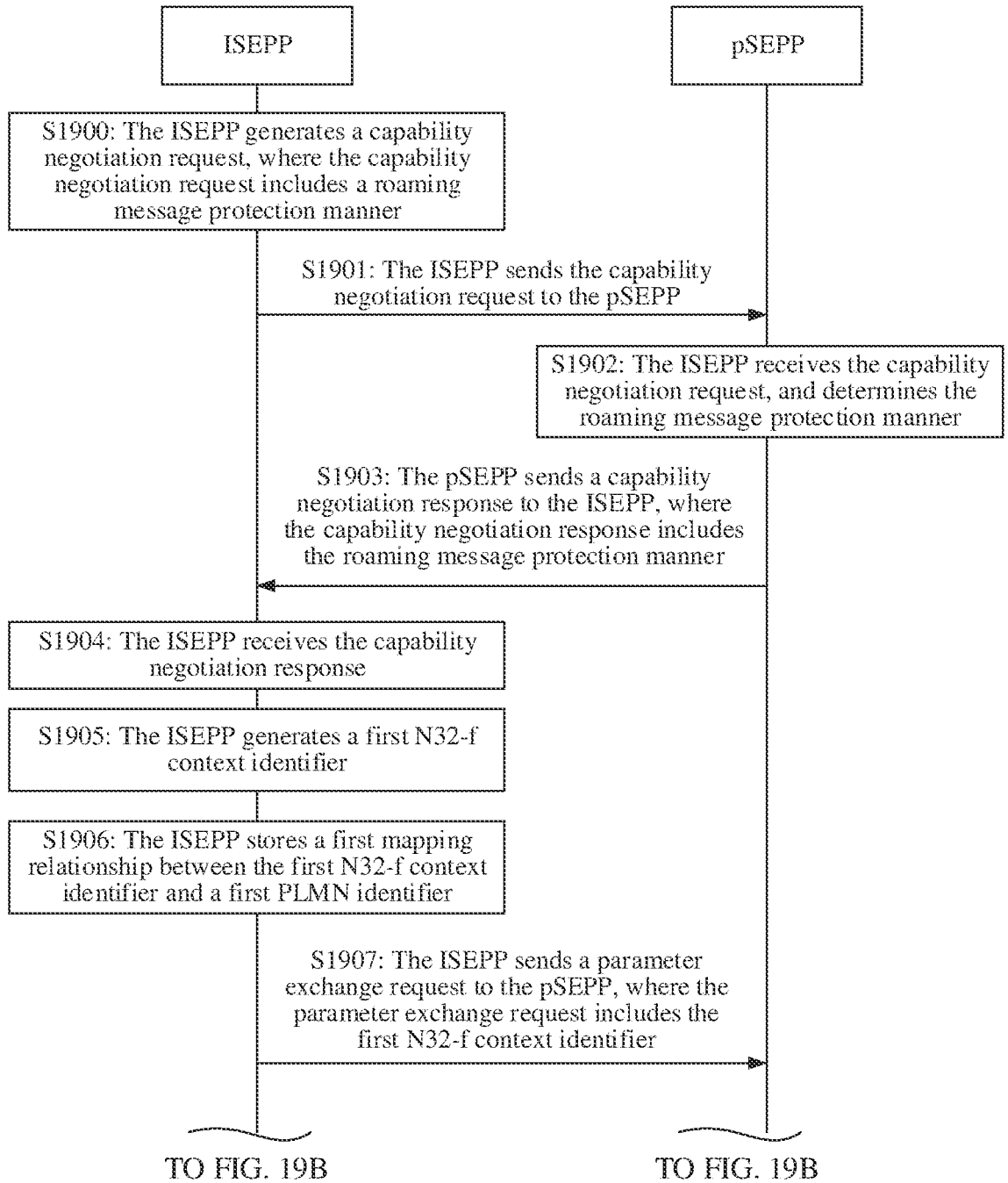
FIG. 19A and FIG. 19B are a schematic flowchart of a second phase of a fourth signaling protection method according to an example embodiment.
Figure 19B:
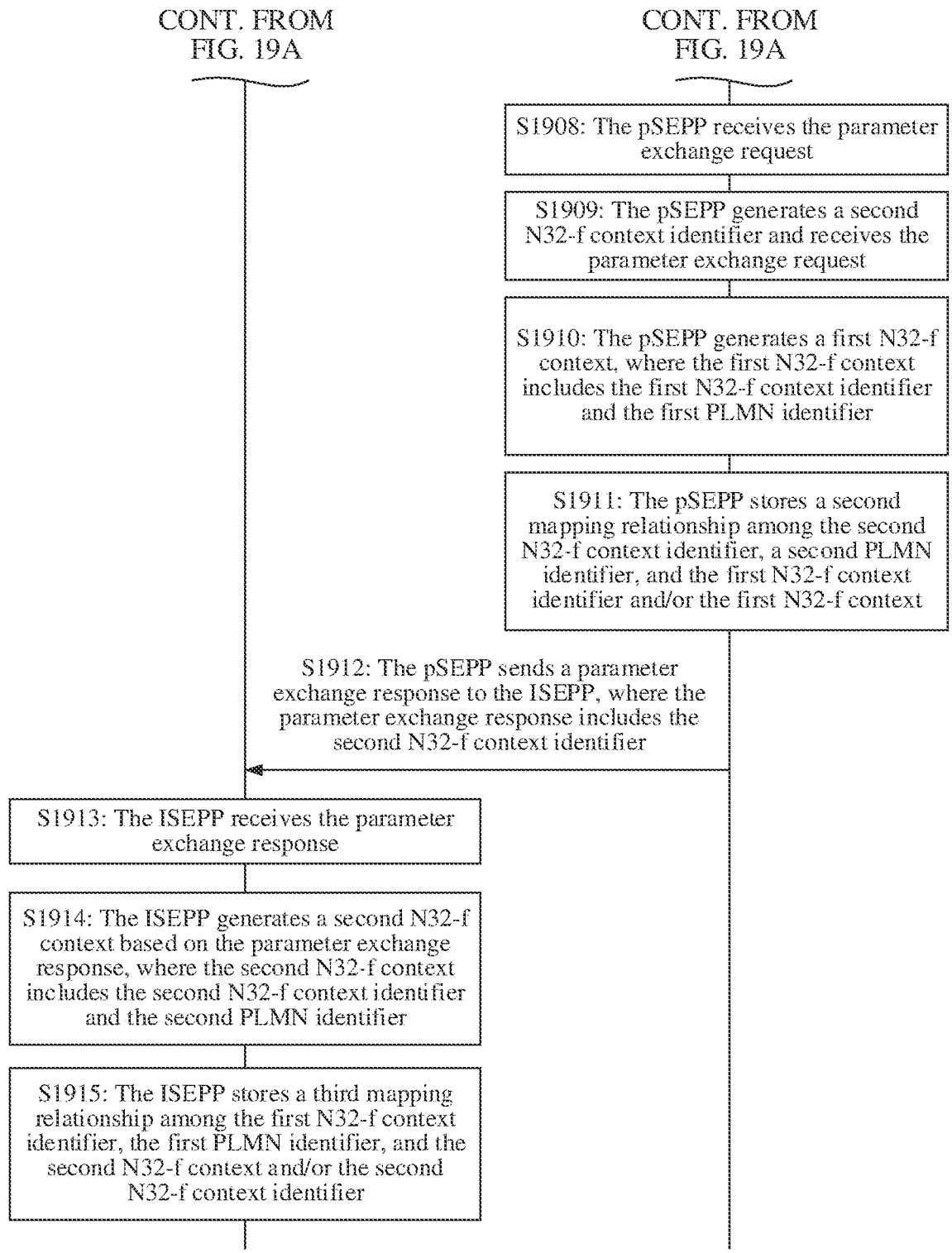

Specifically, as shown in FIG. 19A and FIG. 19B, steps in a second phase of the signaling protection method according to an embodiment are as follows:

S1900: The ISEPP generates a capability negotiation request, where the capability negotiation request further includes a roaming message protection manner.

In an optional manner in this embodiment, the roaming message protection manner may be a PRINS or a TLS. This is not limited herein.

S1901: The ISEPP sends the capability negotiation request to the pSEPP.

S1902: The pSEPP receives the capability negotiation request, and determines the roaming message protection manner.

S1903: The pSEPP sends a capability negotiation response to ISEPP, where the capability negotiation response includes the roaming message protection manner.

S1904: The ISEPP receives the capability negotiation response.

S1905: The ISEPP generates a first N32-f context identifier.

S1906: The ISEPP stores a first mapping relationship between the first N32-f context identifier and a first PLMN identifier.

For example, the first mapping relationship stored by the ISEPP is shown in the following table.

| First N32-f context identifier | First PLMN identifier |
| --- | --- |

Optionally, the ISEPP may locally store the first mapping relationship between the first N32-f context identifier and the first PLMN identifier, or store the first mapping relationship in a third-party device that can be accessed by the ISEPP.

S1907: The ISEPP sends a parameter exchange request to the pSEPP, where the parameter exchange request includes the first N32-f context identifier.

Optionally, the parameter exchange request further includes a protection rule of a service request, and the like.

S1908: The pSEPP receives the parameter exchange request.

S1909: The pSEPP generates a second N32-f context identifier.

S1910: The pSEPP generates a first N32-f context, where the first N32-f context includes the first N32-f context identifier and the first PLMN identifier.

S1911: The pSEPP stores a second mapping relationship among the second N32-f context identifier, a second PLMN identifier, and the first N32-f context identifier and/or the first N32-f context.

In an optional manner in this embodiment, after performing step S1909, the pSEPP establishes and stores a mapping relationship between the second N32-f context identifier and the second PLMN identifier.

Then, after performing step S1910, the pSEPP establishes a mapping relationship between the second N32-f context identifier and the first N32-f context.

An optional implementation of the second mapping relationship is storing the second PLMN identifier and/or the second N32-f context identifier in the first N32-f context.

It should be noted that the second mapping relationship may be indirectly determined, or may be directly determined.

S1912: The pSEPP sends a parameter exchange response to the ISEPP, where the parameter exchange response includes the second N32-f context identifier.

Optionally, the parameter exchange response further includes the protection rule of the service request selected by the pSEPP, and the like.

S1913: The ISEPP receives the parameter exchange response.

S1914: The ISEPP generates a second N32-f context based on the parameter exchange response, where the second N32-f context includes the second N32-f context identifier and the second PLMN identifier.

S1915: The ISEPP establishes and stores a third mapping relationship among the first N32-f context identifier, the first PLMN identifier, the second N32-f context and/or the second N32-f context identifier.

Implementation of the third mapping relationship is similar to implementation of the second mapping relationship. Details are not repeated.

Third Phase: Service Request Phase.

Figure 20:
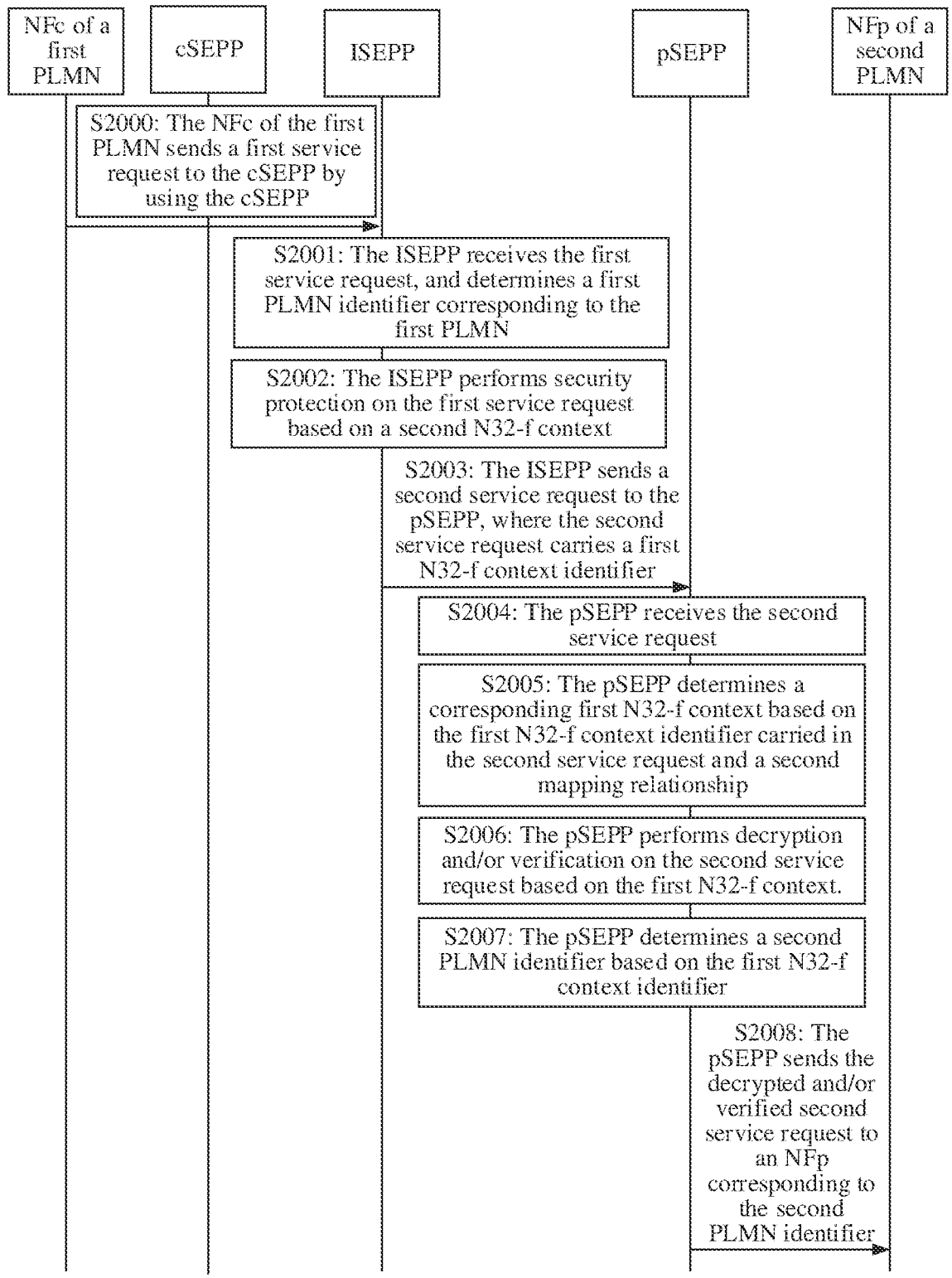
FIG. 20 is a schematic flowchart of a third phase of a fourth signaling protection method according to an example embodiment.

Specifically, as shown in FIG. 20, steps in a third phase of the signaling protection method according to an embodiment are as follows:

S2000: An NFc of the first PLMN sends a first service request to the ISEPP by using the cSEPP.

Optionally, the first service request includes the first PLMN identifier.

S2001: The ISEPP receives the first service request, and determines the first PLMN identifier corresponding to the first PLMN.

In an optional manner in this embodiment, the ISEPP determines the first PLMN identifier based on N32-f context information in the cSEPP.

For example, the ISEPP and the cSEPP also perform N32-C link establishment and N32-F context negotiation. For example, N32-C link establishment and N32-F context negotiation are triggered by powering on both devices or through another offline agreement. In this way, the ISEPP can obtain the N32-f context information in the cSEPP, and determine the first PLMN identifier.

S2002: The ISEPP performs security protection on the first service request based on the second N32-f context.

S2003: The ISEPP sends a second service request to the pSEPP, where the second service request carries the first N32-f context identifier.

The second service request is obtained after the ISEPP protects the first service request and adjusts a format.

S2004: The pSEPP receives the second service request.

S2005: The pSEPP determines the corresponding first N32-f context based on the first N32-f context identifier carried in the second service request, and the second mapping relationship.

S2006: The pSEPP performs decryption and/or verification on the second service request based on the first N32-f context.

S2007: The pSEPP determines the second PLMN identifier based on the first N32-f context identifier.

S2008: The pSEPP sends the decrypted and/or verified second service request to an NFp corresponding to the second PLMN identifier.

When the first request in this embodiment is the capability negotiation request, content of the first phase in this embodiment and steps S1900 to S1904 in the second phase may be integrated. For integrated steps, refer to FIG. 10. For brief description, details are not repeated.

Further, for a case of mapping relationship established between the ISEPP and the pSEPP in the scenario 1 corresponding to the architecture 2, refer to descriptions in the scenario 1 corresponding to the architecture 2. For brief description, details are not repeated.

Scenario 2: PLMNs Share Both an N32-c and N32-f.

The scenario 2 may be understood as follows: There is a third-party forwarding device, that is, a third SEPP (an ISEPP), between a first SEPP (a cSEPP) and a second SEPP (a pSEPP); and the first SEPP (the cSEPP) and the second SEPP (the pSEPP) enable each pair of PLMNs for roaming services to be based on a same N32-c link and a same N32-f link.

An execution process of the signaling protection method may be divided into three phases.

First Phase: Establish a Shared N32-c Link.

Figure 21:
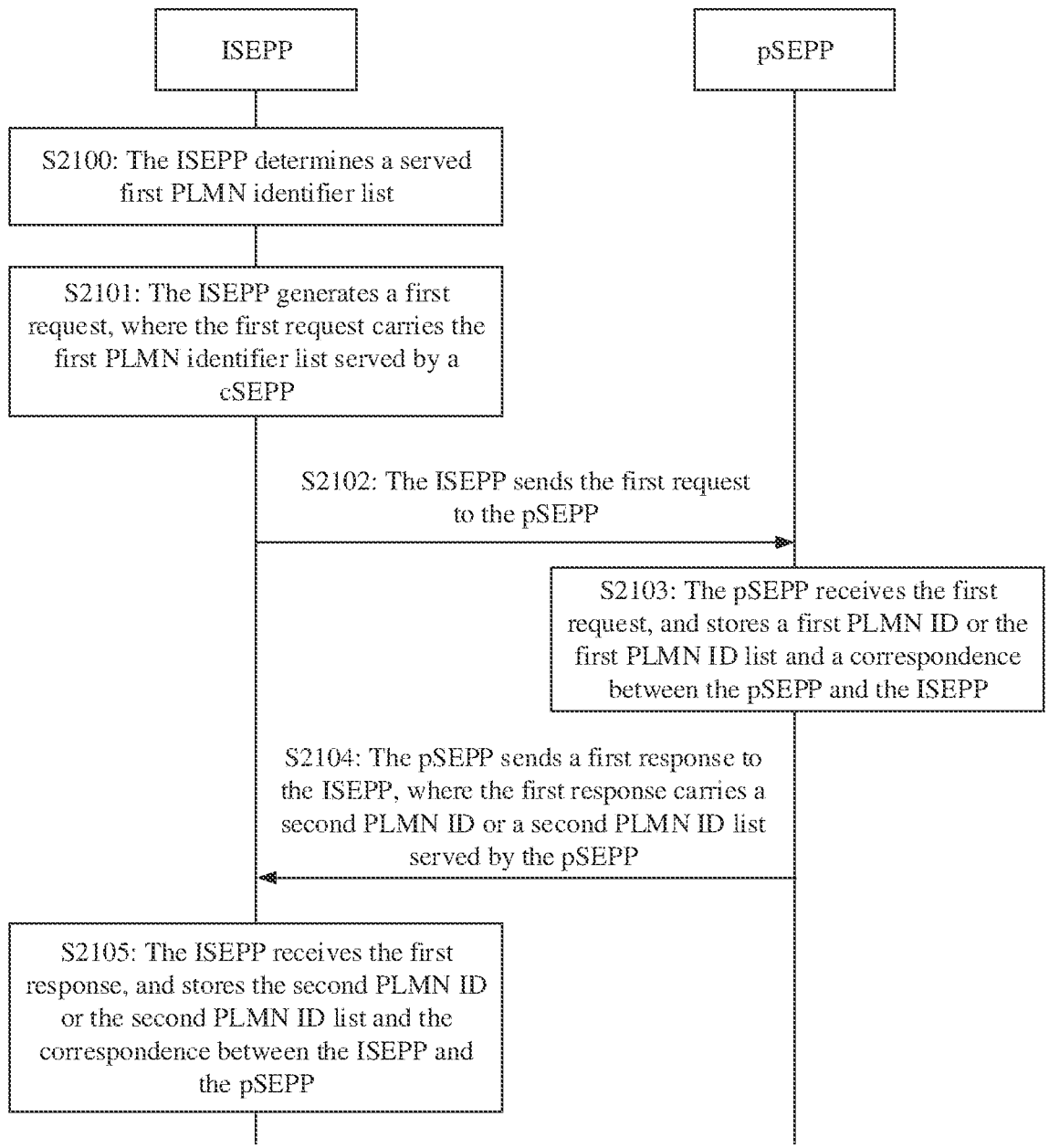
FIG. 21 is a schematic flowchart of a first phase of a sixth signaling protection method according to an example embodiment.

Specifically, as shown in FIG. 21, steps in a first phase of a signaling protection method according to an embodiment are as follows:

S2100: The ISEPP determines a first PLMN identifier list served by the cSEPP.

It should be noted that in this embodiment, there may be one or more first PLMN identifiers in the first PLMN identifier list. When the first PLMN identifier list includes only one PLMN identifier, the cSEPP may determine a served first PLMN identifier.

For example, assuming that PLMNs corresponding to the ISEPP are a PLMN 1 and a PLMN 3, a first PLMN identifier set corresponding to the ISEPP includes the PLMN 1 and a PLMN 2.

S2101: The ISEPP generates a first request, where the first request carries the first PLMN identifier list served by the cSEPP.

In an optional manner in this embodiment, the first request may be a capability negotiation request, an N32-c setup request, or a roaming PLMN ID pair negotiation request. This is not specifically limited herein.

S2102: The ISEPP sends the first request to the pSEPP.

S2103: The pSEPP receives the first request, and stores the first PLMN ID list and a correspondence between the first PLMN ID list and the ISEPP.

S2104: The pSEPP sends a first response to the ISEPP, where the first response carries a second PLMN ID list served by the pSEPP.

S2105: The ISEPP receives the first response, and stores the second PLMN ID list and the correspondence between the second PLMN ID list and the pSEPP.

Based on the foregoing steps, the ISEPP and the pSEPP may be enabled to mutually obtain a PLMN ID or a PLMN ID list of a peer service.

Second Phase: Negotiation and Mapping Establishment Phase.

Figure 22:
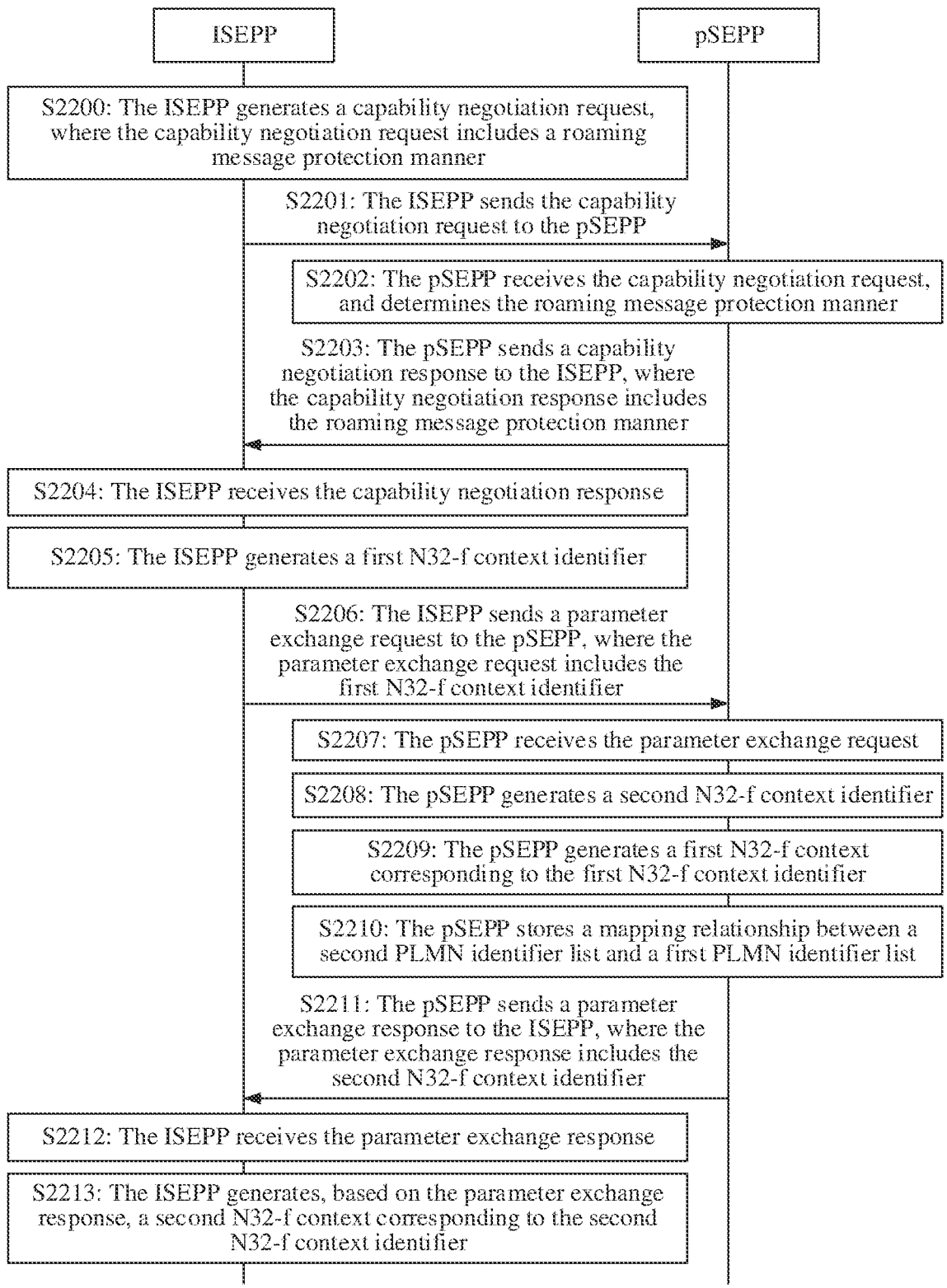
FIG. 22 is a schematic flowchart of a second phase of a fifth signaling protection method according to an example embodiment.

Specifically, as shown in FIG. 22, steps in a second phase of the signaling protection method according to an embodiment are as follows:

S2200: The ISEPP generates a capability negotiation request, where the capability negotiation request includes a roaming message protection manner.

The roaming message protection manner may be, for example, a PRINS or a TLS. This is not limited herein.

S2201: The ISEPP sends the capability negotiation request to the pSEPP.

S2202: The pSEPP receives the capability negotiation request, and determines the roaming message protection manner between a first PLMN identifier list and a second PLMN identifier list.

S2203: The pSEPP sends a capability negotiation response to ISEPP, where the capability negotiation response includes the roaming message protection manner.

S2204: The ISEPP receives the capability negotiation response.

S2205: The ISEPP generates a first N32-f context identifier.

S2206: The ISEPP sends a parameter exchange request to the pSEPP, where the parameter exchange request includes the first N32-f context identifier.

Optionally, the parameter exchange request further includes the roaming message protection manner, and the like.

S2207: The pSEPP receives the parameter exchange request.

S2208: The pSEPP generates a second N32-f context identifier based on the parameter exchange request.

S2209: The pSEPP generates a first N32-f context.

The first N32-f context includes the first N32-f context identifier and a first PLMN identifier.

S2210: The pSEPP stores a mapping relationship between the second PLMN identifier list and the first PLMN identifier list.

Optionally, the pSEPP may store the first PLMN identifier list in the first N32-f context. Alternatively, the pSEPP may store the mapping relationship between the second PLMN identifier list and the first PLMN identifier list in the first N32-f context.

S2211: The pSEPP sends a parameter exchange response to the cSEPP, where the parameter exchange response includes the second N32-f context identifier.

Optionally, the parameter exchange response further includes a protection rule of a service request selected by the pSEPP, and the like.

S2212: The ISEPP receives the parameter exchange response.

S2213: The ISEPP generates, based on the parameter exchange response, a second N32-f context corresponding to the second N32-f context identifier.

Third Phase: Service Request Phase.

Figure 23:
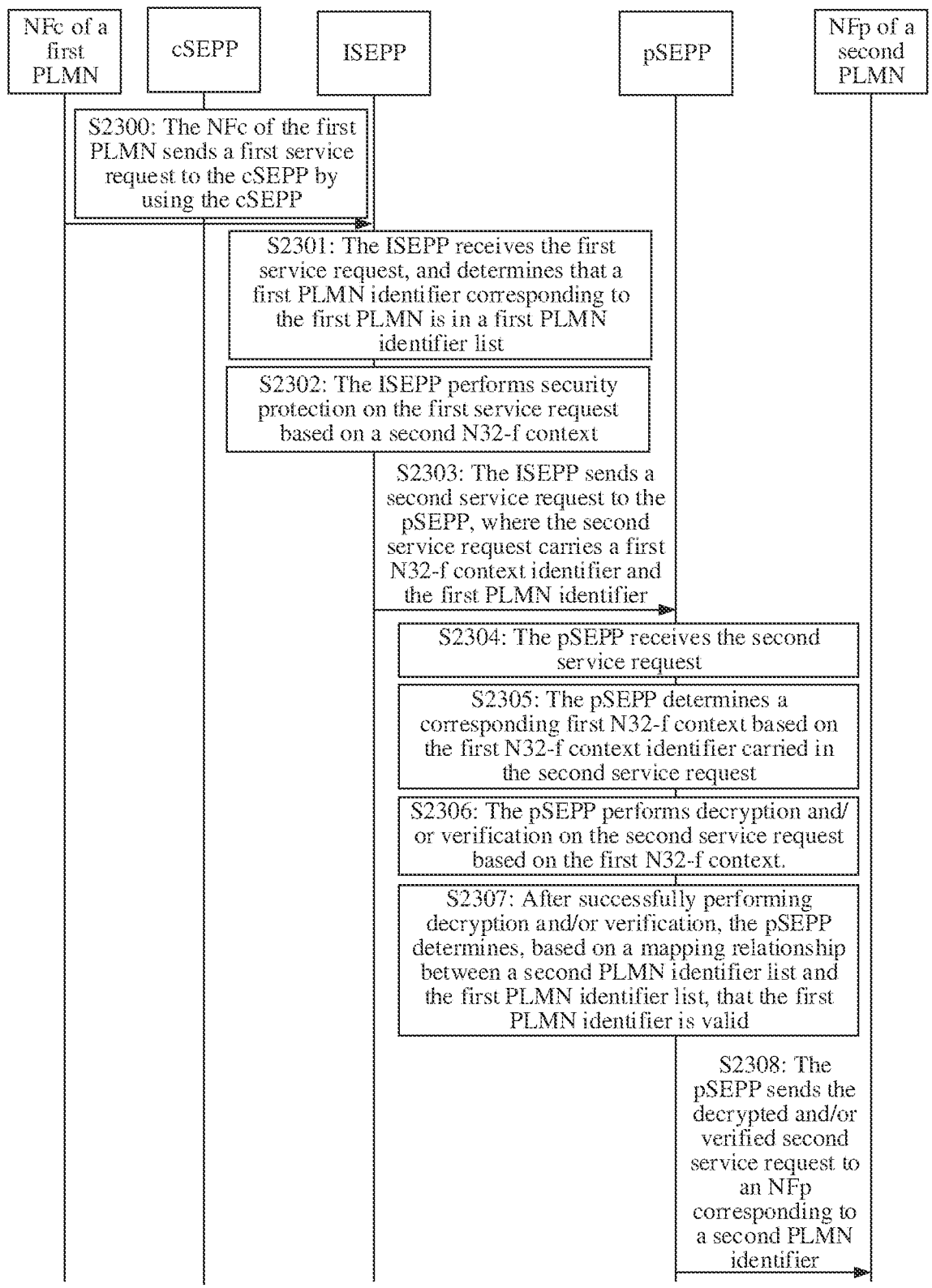
FIG. 23 is a schematic flowchart of a third phase of a fifth signaling protection method according to an example embodiment.

Specifically, as shown in FIG. 23, steps in a second phase of the signaling protection method according to an embodiment are as follows:

S2300: An NFc of the first PLMN sends a first service request to the ISEPP by using the cSEPP.

Optionally, the first service request includes the first PLMN identifier.

S2301: The ISEPP receives the first service request, and determines that the first PLMN identifier corresponding to the first PLMN is in the first PLMN identifier list.

Optionally, if the ISEPP determines that the first PLMN identifier corresponding to the first PLMN is not in the first PLMN identifier list, the ISEPP returns error information to the NFc.

S2302: The ISEPP performs security protection on the first service request based on the second N32-f context.

S2303: The ISEPP sends a second service request to the pSEPP, where the second service request carries the first N32-f context identifier and the first PLMN identifier.

The second service request is obtained after the ISEPP protects the first service request and adjusts a format.

S2304: The pSEPP receives the second service request.

S2305: The pSEPP determines the corresponding first N32-f context based on the first N32-f context identifier carried in the second service request.

S2306: The pSEPP performs decryption and/or verification on the second service request based on the first N32-f context.

S2307: After successfully performing decryption and/or verification, the pSEPP determines, based on a mapping relationship between a second PLMN identifier list and the first PLMN identifier list, that the first PLMN identifier is valid.

Optionally, if determining that the first PLMN identifier exists in the mapping relationship, the pSEPP determines that the PLMN identifier is valid.

Optionally, when the first N32-f context stores the first PLMN list, the pSEPP may determine whether the first PLMN identifier is in the first N32-f context. If the first PLMN identifier is in the first N32-f context, the first PLMN identifier is valid.

Further, if determining that the first PLMN identifier is invalid, the pSEPP feeds back error information to the ISEPP.

S2308: The pSEPP sends the decrypted and/or verified second service request to an NFp corresponding to a second PLMN identifier.

When the first request in this embodiment is the capability negotiation request, content of the first phase in this embodiment and steps S2200 to S2204 in the second phase may be integrated. For integrated steps, refer to FIG. 10. For brief description, details are not repeated.

Scenario 3: PLMNs Share Only an N32-c.

The scenario 3 may be understood as follows: There is a third-party forwarding device, that is, a third SEPP (an ISEPP), between a first SEPP (a cSEPP) and a second SEPP (a pSEPP); and the first SEPP (the cSEPP) and the second SEPP (the pSEPP) share one N32-c link for each pair of PLMNs for roaming services.

An execution process of the signaling protection method may be divided into three phases.

First Phase: Establish a Shared N32-c Link.

In this embodiment, for content of the first phase, refer to descriptions of the first phase in the scenario 2. For brief description, details are not repeated.

Second Phase: Capability Negotiation and Security Context Establishment Phase.

Figure 24A:
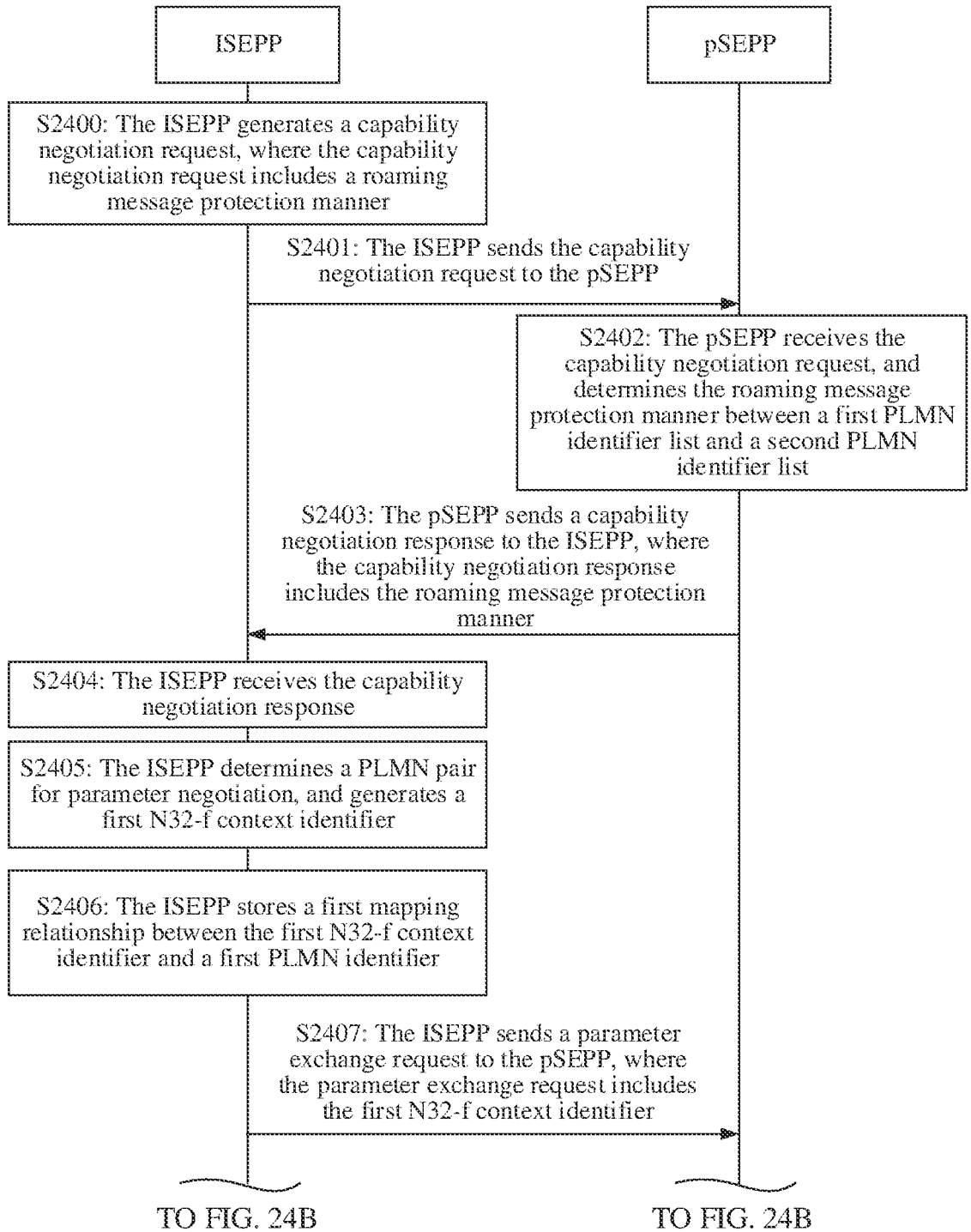
FIG. 24A and FIG. 24B are a schematic flowchart of a second phase of a sixth signaling protection method according to an example embodiment.
Figure 24B:
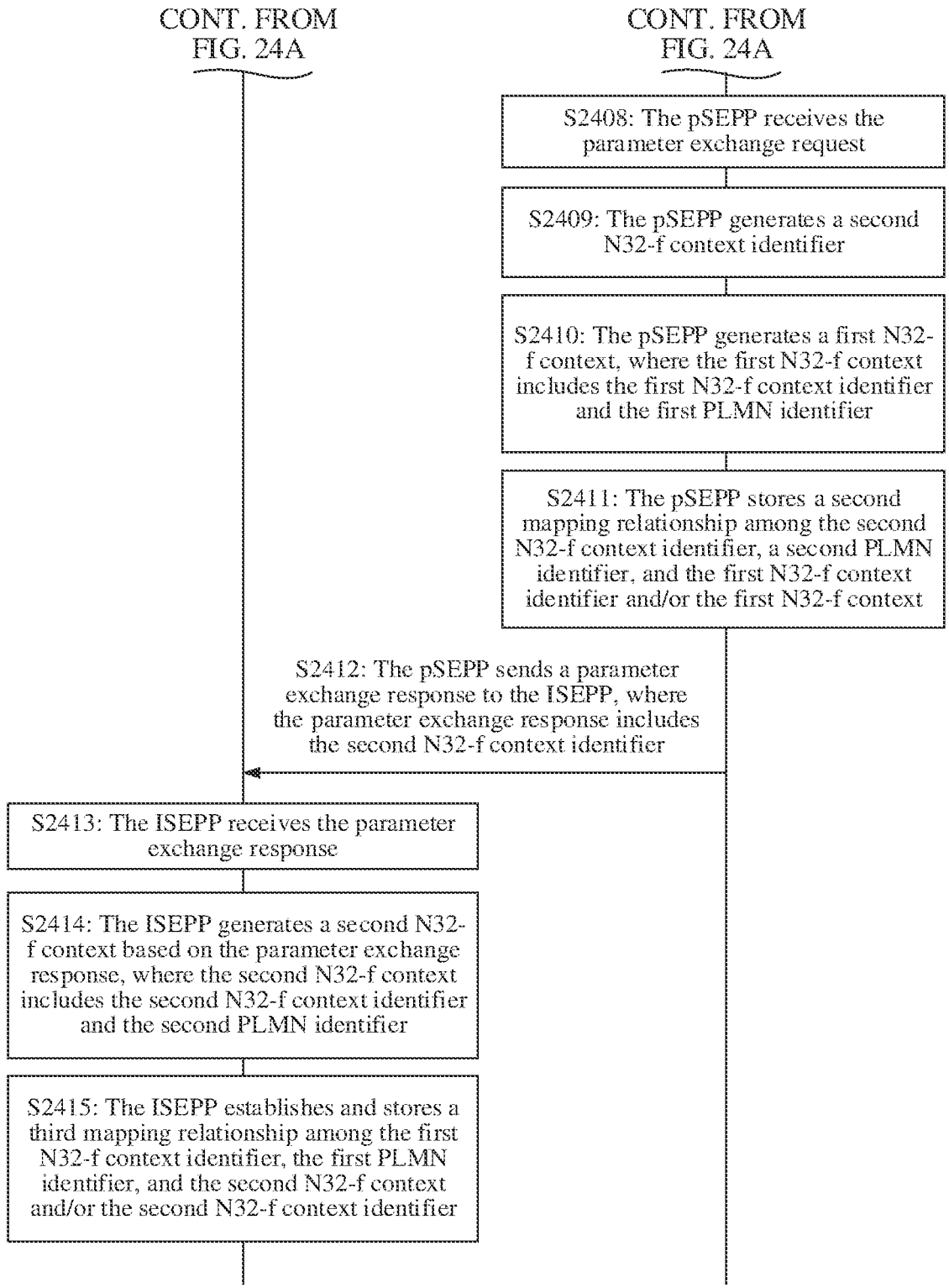

Specifically, as shown in FIG. 24A and FIG. 24B, steps in a second phase of the signaling protection method according to an embodiment are as follows:

S2400: The ISEPP generates a capability negotiation request, where the capability negotiation request includes a roaming message protection manner.

The roaming message protection manner may be a PRINS or a TLS. This is not limited herein.

S2401: The ISEPP sends the capability negotiation request to a pSEPP.

S2402: The pSEPP receives the capability negotiation request, and determines the roaming message protection manner between a first PLMN identifier list and a second PLMN identifier list.

S2403: The pSEPP sends a capability negotiation response to ISEPP, where the capability negotiation response includes the roaming message protection manner.

S2404: The ISEPP receives the capability negotiation response.

In an optional manner, the foregoing procedure may alternatively be: The ISEPP determines a PLMN pair that performs capability negotiation through the pSEPP, that is, determines a first PLMN identifier and a second PLMN identifier, and the ISEPP carries the first PLMN identifier and the second PLMN identifier in the capability negotiation request. The pSEPP determines the roaming message protection manner between the first PLMN identifier and the second PLMN identifier. In this way, the ISEPP and the pSEPP may alternatively determine a used protection manner.

S2405: The ISEPP determines a PLMN pair for parameter negotiation, and generates a first N32-f context identifier.

In other words, the ISEPP determines the first PLMN identifier and the second PLMN identifier, and generates the first N32-f context identifier.

S2406: The ISEPP stores a first mapping relationship between the first N32-f context identifier and the first PLMN identifier.

Optionally, the ISEPP may locally store the first mapping relationship between the first N32-f context identifier and the first PLMN identifier, or store the first mapping relationship in a third-party device that can be accessed by the ISEPP.

S2407: The ISEPP sends a parameter exchange request to the pSEPP, where the parameter exchange request includes the first N32-f context identifier.

Optionally, the parameter exchange request further includes a protection rule of a service request, and the like.

S2408: The pSEPP receives the parameter exchange request.

S2409: The pSEPP generates a second N32-f context identifier.

S2410: The pSEPP generates a first N32-f context, where the first N32-f context includes the first N32-f context identifier and the first PLMN identifier.

S2411: The pSEPP stores a second mapping relationship among the second N32-f context identifier, the second PLMN identifier, and the first N32-f context identifier and/or the first N32-f context.

In an optional manner in this embodiment, after performing step S2410, the pSEPP establishes and stores a mapping relationship between the second N32-f context identifier and the second PLMN identifier.

Then, after performing step S2411, the pSEPP establishes a mapping relationship between the second N32-f context identifier and the first N32-f context.

An optional implementation of the second mapping relationship is storing the second PLMN identifier and/or the second N32-f context identifier in the first N32-f context.

It should be noted that the second mapping relationship may be indirectly determined, or may be directly determined.

S2412: The pSEPP sends a parameter exchange response to the ISEPP, where the parameter exchange response includes the second N32-f context identifier.

Optionally, the parameter exchange response further includes the protection rule of the service request selected by the pSEPP, and the like.

S2413: The ISEPP receives the parameter exchange response.

S2414: The ISEPP generates a second N32-f context based on the parameter exchange response, where the second N32-f context includes the second N32-f context identifier and the second PLMN identifier.

S2415: The ISEPP establishes and stores a third mapping relationship among the first N32-f context identifier, the first PLMN identifier, and the second N32-f context and/or the second N32-f context identifier.

Implementation of the third mapping relationship is similar to implementation of the second mapping relationship. Details are not repeated.

Third Phase: Service Request Phase.

Figure 25:
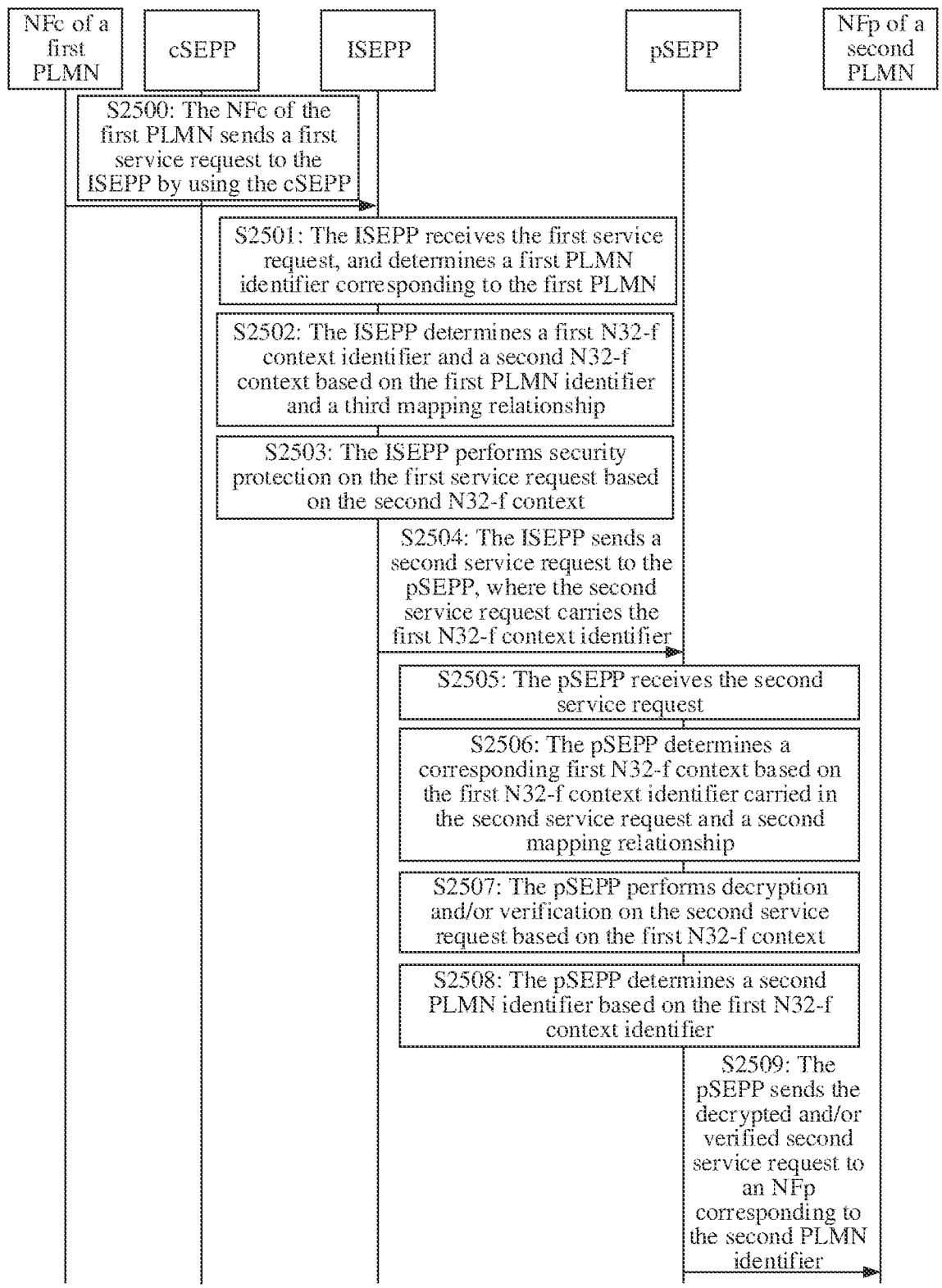
FIG. 25 is a schematic flowchart of a third phase of a sixth signaling protection method according to an example embodiment.

Specifically, as shown in FIG. 25, steps in a third phase of the signaling protection method according to an embodiment are as follows:

S2500: An NFc of the first PLMN sends a first service request to the ISEPP by using the cSEPP.

Optionally, the first service request includes the first PLMN identifier.

S2501: The ISEPP receives the first service request, and determines the first PLMN identifier corresponding to the first PLMN.

In an optional manner in this embodiment, when the first service request includes the first PLMN identifier, the ISEPP may determine the first PLMN identifier based on the first service request.

In another optional manner in this embodiment, the ISEPP may determine the first PLMN identifier based on transport layer information.

For example, the NFc of the first PLMN establishes a transport layer link to the ISEPP. Therefore, the ISEPP may determine the first PLMN ID by using some or all information such as an IP address, a port number, a domain name, and a certificate.

S2502: The ISEPP determines the first N32-f context identifier and the second N32-f context based on the first PLMN identifier and the third mapping relationship.

S2503: The ISEPP performs security protection on the first service request based on the second N32-f context.

S2504: The ISEPP sends a second service request to a pSEPP, where the second service request carries the first N32-f context identifier.

The second service request is obtained after the ISEPP protects the first service request and adjusts a format.

S2505: The pSEPP receives the second service request.

S2506: The pSEPP determines a corresponding first N32-f context based on the first N32-f context identifier carried in the second service request, and the second mapping relationship.

S2507: The pSEPP performs decryption and/or verification on the second service request based on the first N32-f context.

S2508: The pSEPP determines the second PLMN identifier based on the first N32-f context identifier.

S2509: The pSEPP sends the decrypted and/or verified second service request to an NFp corresponding to the second PLMN identifier.

When the first request in this embodiment is the capability negotiation request, content of the first phase in this embodiment and steps S2400 to S2404 in the second phase may be integrated. For integrated steps, refer to FIG. 10. For brief description, details are not repeated.

For mapping relationships in the scenario 3, refer to descriptions in the scenario 1. For brief description, details are not repeated.

Based on the foregoing descriptions of the solutions, it may be understood that, to implement the foregoing functions, the foregoing devices include corresponding hardware structures and/or software modules for performing the functions. A person of ordinary skill in the art should easily be aware that, in combination with the examples described in embodiments disclosed in this specification, units, algorithms and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 26:
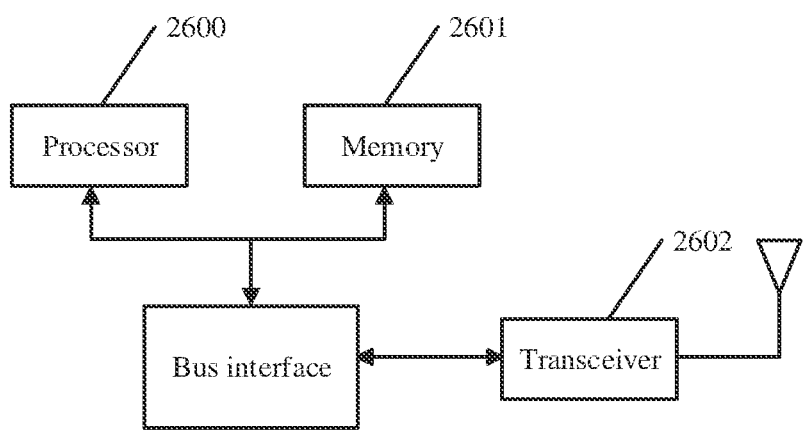
FIG. 26 is a schematic diagram of a signaling protection apparatus according to an example embodiment.

Based on the foregoing embodiments, as shown in FIG. 26, an embodiment further provides a signaling protection apparatus. The apparatus includes a processor 2600, a memory 2601, and a transceiver 2602.

The processor 2600 is responsible for bus architecture management and general processing. The memory 2601 may store data used when the processor 2600 performs an operation. The transceiver 2602 is configured to receive and send data under control of the processor 2600, to perform data communication with the memory 2601.

The bus architecture may include any quantity of interconnected buses and bridges, and specifically connects together various circuits of one or more processors represented by the processor 2600 and a memory represented by the memory 2601. The bus architecture may further connect various other circuits such as a peripheral device, a voltage stabilizer, and a power management circuit. These are well known in the art, and therefore are not further described in this specification. A bus interface provides an interface. The processor 2600 is responsible for bus architecture management and general processing. The memory 2601 may store the data used when the processor 2600 performs the operation.

A procedure disclosed in embodiments may be applied to the processor 2600, or implemented by the processor 2600. In an implementation process, steps in a signal processing procedure may be completed by using an integrated logic circuit of hardware in the processor 2600 or instructions in a form of software. The processor 2600 may be a general-purpose processor, a digital signal processor, an application-specific integrated circuit, a field programmable gate array, another programmable logic device, a discrete gate, a transistor logic device, or a discrete hardware component, and may implement or perform the methods, steps, and logical block diagrams disclosed in embodiments. The general-purpose processor may be a microprocessor, any conventional processor, or the like. The steps of the methods disclosed with reference to embodiments may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 2601. The processor 2600 reads information in the memory 2601 and completes the steps of the signal processing procedure in combination with hardware of the processor 2600.

When the signaling protection apparatus is a first SEPP, the processor 2600 is configured to read a program in the memory 2601, and perform the method procedure performed by the first SEPP shown in at least one of FIG. 6 to FIG. 25.

When the signaling protection apparatus is a second SEPP, the processor 2600 is configured to read the program in the memory 2601, and perform the method procedure performed by the second SEPP shown in at least one of FIG. 6 to FIG. 25.

When the signaling protection apparatus is a third SEPP, the processor 2600 is configured to read the program in the memory 2601, and perform the method procedure performed by the third SEPP shown in at least one of FIG. 17 to FIG. 25.

Figure 27:
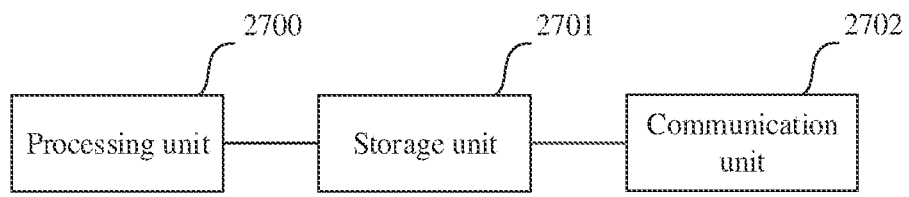
FIG. 27 is a schematic diagram of another signaling protection apparatus according to an example embodiment.

As shown in FIG. 27, example embodiments provide a signaling protection apparatus. The signaling protection apparatus includes at least one processing unit 2700, at least one storage unit 2701, and at least one communication unit 2702. The communication unit 2702 is configured to receive and send data under control of the processing unit 2700, and the storage unit 2701 stores program code.

In an optional manner in this embodiment, the signaling protection apparatus is a pSEPP. When the program code is executed by the processing unit 2700, the processing unit 2700 is enabled to perform the following process:
receiving a first service request from a first security edge protection proxy serving a first public land mobile network by using the communication unit 2702, where a connection that is between a second security edge protection proxy and the first security edge protection proxy and is for a second public land mobile network and the first public land mobile network includes first N32-f, the first service request includes a first N32-f context context identifier, and the first N32-f context identifier corresponds to the first N32-f; determining a second service request based on the first service request; determining a corresponding second public land mobile network based on the first N32-f context identifier; and sending the second service request to a network function of the second public land mobile network.

In an optional manner in this embodiment, the signaling protection apparatus is the pSEPP. When the program code is executed by the processing unit 2700, the processing unit 2700 is enabled to perform the following process:
receiving the first request from the first SEPP by using the communication unit 2702, where the first request carries information about the first PLMN and requested information about the second PLMN, and an N32-c link needs to be established between the first PLMN and the second PLMN; and the second SEPP determines, based on the first request, a first PLMN ID and a requested second PLMN ID.

In an optional manner in this embodiment, the signaling protection apparatus is the pSEPP. When the program code is executed by the processing unit 2700, the processing unit 2700 is enabled to perform the following process:

receiving the first request from the first SEPP by using the communication unit 2702, where the first request carries the ID of the first PLMN and the ID of the second PLMN between which the N32-c link needs to be established; and the second SEPP receives the first request, to obtain the first PLMN ID and the second PLMN ID.

In an optional manner in this embodiment, the signaling protection apparatus is the pSEPP. When the program code is executed by the processing unit 2700, the processing unit 2700 is enabled to perform the following process:

receiving the first request from the first SEPP by using the communication unit 2702, where the first request carries a first PLMN identifier list served by the first SEPP; and the second SEPP stores the first PLMN ID list and a correspondence between the first PLMN ID list and the first SEPP.

In an optional manner in this embodiment, the signaling protection apparatus is the pSEPP. When the program code is executed by the processing unit 2700, the processing unit 2700 is enabled to perform the following process:

receiving the first service request from the first SEPP by using the communication unit 2702, where the first service request carries the first PLMN identifier; the second SEPP determines, based on a mapping relationship between a second PLMN identifier list and the first PLMN identifier list, that the first PLMN identifier is valid; the second SEPP sends the second service request to the NF of the second PLMN; and the second service request is determined by the second SEPP based on the first service request.

In an optional manner in this embodiment, the signaling protection apparatus is a cSEPP. When the program code is executed by the processing unit 2700, the processing unit 2700 is enabled to perform the following process:

receiving, by using the communication unit 2702, a third service request that is from a network function of the first public land mobile network and that is sent to the network function of the second public land mobile network, where the second security edge protection proxy serves the second public land mobile network, and the connection that is between the first security edge protection proxy and the second security edge protection proxy and is for the first public land mobile network and the second public land mobile network includes the first N32-f; determining the first public land mobile network identifier based on configuration information; the first security edge protection proxy determines the first N32-f context context identifier corresponding to the first public land mobile network identifier, where the first N32-f context identifier corresponds to the first N32-f; determining the first service request based on the third service request; and sending the first service request to the second security edge protection proxy, where the first service request includes the first N32-f context identifier.

In an optional manner in this embodiment, the signaling protection apparatus is the cSEPP. When the program code is executed by the processing unit 2700, the processing unit 2700 is enabled to perform the following process:

determining the first PLMN and the second PLMN between which the N32-c link needs to be established; the first SEPP generates the first request, where the first request carries the information about the first PLMN and the requested information about the second PLMN, and the N32-c link needs to be established between the first PLMN and the second PLMN; and the first SEPP sends the first request to the second SEPP.

In an optional manner in this embodiment, the signaling protection apparatus is the cSEPP. When the program code is executed by the processing unit 2700, the processing unit 2700 is enabled to perform the following process:

determining the first PLMN and the second PLMN between which the N32-c link needs to be established; the first SEPP generates the first request, where the first request carries the identifier of the first PLMN and the requested identifier of the second PLMN between which the N32-c link needs to be established; and the first SEPP sends the first request to the second SEPP.

In an optional manner in this embodiment, the signaling protection apparatus is the cSEPP. When the program code is executed by the processing unit 2700, the processing unit 2700 is enabled to perform the following process:

determining the served first PLMN identifier list; the first SEPP generates the first request, where the first request carries the first PLMN identifier list served by the second SEPP; and the first SEPP sends the first request to the second SEPP.

In an optional manner in this embodiment, the signaling protection apparatus is the cSEPP. When the program code is executed by the processing unit 2700, the processing unit 2700 is enabled to perform the following process:

receiving the third service request from the NF in the first PLMN by using the communication unit 2702, where the third service request includes the first PLMN identifier; the first SEPP determines that the first PLMN identifier corresponding to the first PLMN is in the first PLMN identifier list; the first SEPP sends the first service request to the second SEPP, where the first service request carries the first N32-f context identifier generated by the first SEPP, and the first PLMN identifier; and the first service request is obtained by the first SEPP based on the third service request.

Functions of the communication unit 2702 and the processing unit 2700 shown in FIG. 27 may be performed by the processor 2600 by running a program in the memory 2601, or performed only by the processor 2600.

The signaling protection apparatus shown in FIG. 27 may be the SEPP in the foregoing embodiment, or a chip in the SEPP.

In some possible implementations, aspects of the signaling protection method provided in embodiments may be further implemented in a form of a program product, including program code. When the program code is run on a computer device, the program code is used to enable the computer device to perform steps in the signaling protection method based on various example implementations described in this specification.

The program product may be any combination of one or more readable media. The readable medium may be a readable signal medium or a readable storage medium. For example, the readable storage medium may be, but is not limited to, an electrical, a magnetic, an optical, an electromagnetic, an infrared, or a semiconductor system, apparatus or device, or any combination thereof. More specific examples (non-exhaustive list) of the readable storage medium include: an electrical connection having one or more conducting wires, a portable disk, a hard disk drive, a random access memory (RAM), a read-only memory (ROM), an erasable programmable read-only memory (EPROM or a flash memory), an optical fiber, a portable compact disc read-only memory (CD-ROM), an optical storage component, a magnetic storage component, or any appropriate combination thereof.

The program product for perform signaling protection in implementations may use a portable compact disc read-only memory (CD-ROM) and include the program code, and may be run on a server device. However, the program product is not limited thereto. In this specification, the readable storage medium may be any tangible medium that includes or stores a program, and the program can be transmitted as information, used by an apparatus or a component, or used in combination with an apparatus or a component.

The readable signal medium may include a data signal propagated in a baseband or as a part of a cell, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF medium, or any appropriate combination thereof.

The program code used to perform operations may be written in any combination of one or more program design languages. The program design language includes object-oriented program design languages such as Java and C++, and further include a conventional procedural program design language such as a "C" language or a similar program design language. The program code may be completely executed on a computing device of a user, partially executed on user equipment, executed as an independent software package, partially executed on a computing device of a user and partially executed on a remote computing device, or completely executed on a remote computing device or a server. When the program code is executed on the remote computing device, the remote computing device may be connected to the computing device of the user by using any type of network, including a local area network (LAN) or a wide area network (WAN), or may be connected to an external computing device.

An embodiment further provides a computing device readable storage medium for the signaling protection method performed by a terminal device, in other words, content is not lost in a case of power off. The storage medium stores a software program, including program code. When the program code is run on a computing device, and the software program is read and executed by one or more processors, any service flow distribution solution in embodiments may be implemented.

An embodiment further provides a computing device readable storage medium for the signaling protection method performed by a network device, in other words, content is not lost in a case of power off. The storage medium stores a software program, including program code. When the program code is run on a computing device, and the software program is read and executed by one or more processors, any service flow distribution solution in embodiments may be implemented.

The foregoing describes this application with reference to block diagrams and/or flowcharts of the method, the apparatus (system), and/or the computer program product in embodiments of this application. It should be understood that a block of the block diagrams and/or flowcharts and a combination of blocks in the block diagrams and/or flowcharts, can be implemented by using computer program instructions. These computer program instructions may be provided to a processor of a general-purpose computer, a processor of a special-purpose computer, or another programmable data processing apparatus, to produce a machine, so that instructions executed by the processor of the computer and/or the another programmable data processing apparatus create a method for implementing a specific function/action in the block diagrams and/or blocks in the flowcharts.

Correspondingly, this application may further be implemented by using hardware and/or software (including firmware, resident software, microcode, and the like). Still further, this application may be in a form of a computer program product on a computer-usable or computer-readable storage medium. The computer program product has computer-usable or computer-readable program code implemented in a medium, to be used by an instruction execution system, or used in combination with an instruction execution system. In the context of this application, the computer-usable or computer-readable medium may be any medium, and may include, store, communicate, transmit, or transfer a program, to be used by an instruction execution system, apparatus, or device, or used in combination with an instruction execution system, apparatus, or device.

Although this application is described with reference to specific features and embodiments thereof, it is clear that various modifications and combinations may be made to this application without departing from the spirit and scope of this application. Correspondingly, the specification and accompanying drawings are merely example description of this application defined by the appended claims, and are considered as any of or all modifications, variations, combinations or equivalents that cover the scope of this application. It is clear that a person skilled in the art can make various modifications and variations to this application without departing from the scope of this application. In this way, this application is intended to cover these modifications and variations provided that these modifications and variations of this application fall within the scope of the claims of this application and their equivalent technologies.

What is claimed is:

1. A signaling protection method performed by a first security edge protection proxy, comprising:
   receiving a third service request that is from a network function of a first public land mobile network and that is sent to a network function of a second public land mobile network served by a second security edge protection proxy, wherein a connection that is between the first security edge protection proxy and the second security edge protection proxy and is for the first public land mobile network and the second public land mobile network comprises first number 32 forwarding (N32-f);
   determining an identifier of the first public land mobile network based on configuration information;
   determining a first N32-f context identifier corresponding to the identifier of the first public land mobile network, wherein the first N32-f context identifier corresponds to the first N32-f;
   determining a first service request based on the third service request; and
   sending the first service request to the second security edge protection proxy, wherein the first service request comprises the first N32-f context identifier.

2. The method according to claim 1, wherein:
the first security edge protection proxy is connected to a third public land mobile network and the first public land mobile network,
a connection that is between the first security edge protection proxy and the second security edge protection proxy and is for the third public land mobile network and the second public land mobile network comprises second N32-f, and
the second N32-f corresponds to a second N32-f context identifier.

3. The method according to claim 1, wherein determining a first N32-f context identifier corresponding to the identifier of the first public land mobile network comprises:
determining the first N32-f context identifier based on the identifier of the first public land mobile network and a mapping relationship between the first N32-f context identifier and the identifier of the first public land mobile network.

4. The method according to claim 1, wherein the method further comprises:
obtaining, from a security negotiation response received from the second security edge protection proxy, a third N32-f context identifier carried in the security negotiation response;
generating a third N32-f context based on the security negotiation response, wherein the third N32-f context comprises the third N32-f context identifier, and the third N32-f context or the third N32-f context identifier corresponds to the identifier of the first public land mobile network;
performing, before determining the first service request based on the third service request, at least one operation comprising determining the third N32-f context based on the identifier of the first public land mobile network; and
determining the first service request based on the third service request comprises performing security protection on the third service request by using the third N32-f context, to obtain the first service request.

5. The method according to claim 1, further including, before sending the first service request to the second security edge protection proxy, at least one operation comprising:
sending a parameter exchange request to the second security edge protection proxy, wherein the parameter exchange request comprises the first N32-f context identifier generated when the first security edge protection proxy is used to perform security parameter negotiation, and a public land mobile network identifier pair that is of public land mobile networks performing security parameter negotiation and that is determined by the first security edge protection proxy, wherein
the public land mobile network identifier pair comprises the identifier of the first public land mobile network and an identifier of the second public land mobile network.

6. The method according to claim 1, wherein determining the identifier of the first public land mobile network based on configuration information comprises:
determining the identifier of the first public land mobile network based on transport layer information of the network function of the first public land mobile network.

7. The method according to claim 1, further including, before receiving the third service request sent by a network function of the first public land mobile network, performing operations comprising:

determining a public land mobile network identifier pair of public land mobile networks performing interaction access through the second security edge protection proxy, wherein the public land mobile network identifier pair comprises the identifier of the first public land mobile network and an identifier of the second public land mobile network; and
notifying the second security edge protection proxy of the public land mobile network identifier pair for interaction access.

8. The method according to claim 7, wherein determining the public land mobile network identifier pair comprises:
determining an identifier pair that is of public land mobile networks performing interaction access and that corresponds to a link to be established between the first security edge protection proxy and the second security edge protection proxy; or
determining an identifier pair that is of public land mobile networks performing interaction access and that corresponds to a link to be subsequently established between the first security edge protection proxy and the second security edge protection proxy; or
determining an identifier pair that is of public land mobile networks performing interaction access and that corresponds to a link that has been established between the first security edge protection proxy and the second security edge protection proxy.

9. A signaling protection method performed by a security edge protection proxy, comprising:
receiving a first service request from another security edge protection proxy serving a first public land mobile network, wherein a connection that is between the security edge protection proxy and the another security edge protection proxy and is for a second public land mobile network and the first public land mobile network comprises first number 32 forwarding (N32-f), and the first service request comprises a first N32-f context identifier corresponding to the first N32-f;
determining a second service request based on the first service request;
determining a corresponding second public land mobile network based on the first N32-f context identifier; and
sending the second service request to a network function of the second public land mobile network.

10. The method according to claim 9, wherein the security edge protection proxy is connected to a fourth public land mobile network and the second public land mobile network, a connection that is between the security edge protection proxy and the another security edge protection proxy and is for the fourth public land mobile network and the first public land mobile network comprises second N32-f, and the second N32-f corresponds to a second N32-f context identifier.

11. The method according to claim 9, wherein determining the corresponding second public land mobile network based on the first N32-f context identifier comprises:
determining the second public land mobile network based on the first N32-f context identifier and a mapping relationship between the first N32-f context identifier and an identifier of the second public land mobile network.

12. The method according to claim 9, further comprising:
sending a security negotiation response to the another security edge protection proxy, wherein the security negotiation response carries a third N32-f context identifier; and after receiving the first service request from the another security edge protection proxy corresponding to the first public land mobile network, performing security verification on the first service request by using a third N32-f context corresponding to the third N32-f context identifier.

13. The method according to claim 9, further including, before receiving the first service request:
receiving a parameter exchange request from the another security edge protection proxy, wherein the parameter exchange request comprises the first N32-f context identifier generated when the another security edge protection proxy is used to perform security parameter negotiation, and a public land mobile network identifier pair that is of public land mobile networks performing security parameter negotiation and that is determined by the security edge protection proxy, wherein
the public land mobile network identifier pair comprises an identifier of the first public land mobile network and the identifier of the second public land mobile network.

14. A signaling protection apparatus, comprising one or more processors coupled to one or more memories, wherein the one or more processors is/are configured to read program instructions stored in the one or more memories and perform operations comprising:
receiving a third service request that is from a network function of a first public land mobile network and that is sent to a network function of a second public land mobile network served by a second security edge protection proxy, wherein a connection that is between a first security edge protection proxy and the second security edge protection proxy and is for the first public land mobile network and the second public land mobile network comprises first number 32 forwarding (N32-f);
determining an identifier of the first public land mobile network based on configuration information;
determining a first N32-f context identifier corresponding to the identifier of the first public land mobile network, wherein the first N32-f context identifier corresponds to the first N32-f;
determining a first service request based on the third service request; and
sending the first service request to the second security edge protection proxy, wherein the first service request comprises the first N32-f context identifier.

15. The apparatus according to claim 14, wherein:
the first security edge protection proxy is connected to a third public land mobile network and the first public land mobile network,
a connection that is between the first security edge protection proxy and the second security edge protection proxy and is for the third public land mobile network and the second public land mobile network comprises second N32-f, and
the second N32-f corresponds to a second N32-f context identifier.

16. The apparatus according to claim 14, wherein the operations further comprise determining the first N32-f context identifier based on the identifier of the first public land mobile network and a mapping relationship between the first N32-f context identifier and the identifier of the first public land mobile network.

17. The apparatus according to claim 14, wherein the operations further comprise:
obtaining, from a security negotiation response received from the second security edge protection proxy, a third N32-f context identifier carried in the security negotiation response; and generating a third N32-f context based on the security negotiation response, wherein the third N32-f context comprises the third N32-f context identifier, and the third N32-f context or the third N32-f context identifier corresponds to the identifier of the first public land mobile network;
before determining the first service request based on the third service request, determining the third N32-f context based on the identifier of the first public land mobile network; and
when determining the first service request based on the third service request, performing security protection on the third service request by using the third N32-f context, to obtain the first service request.

18. The apparatus according to claim 14, wherein the operations further comprise:
sending a parameter exchange request to the second security edge protection proxy, wherein the parameter exchange request comprises the first N32-f context identifier generated when the first security edge protection proxy is used to perform security parameter negotiation, and a public land mobile network identifier pair that is of public land mobile networks performing security parameter negotiation and that is determined by the first security edge protection proxy, wherein the public land mobile network identifier pair comprises the identifier of the first public land mobile network and an identifier of the second public land mobile network.

19. The apparatus according to claim 14, wherein the operations further comprise:
determining the identifier of the first public land mobile network based on transport layer information of the network function of the first public land mobile network.

20. The apparatus according to claim 14, wherein the operations further comprise:
determining a public land mobile network identifier pair of the public land mobile networks that perform interaction access through the second security edge protection proxy, wherein the public land mobile network identifier pair comprises the identifier of the first public land mobile network and an identifier of the second public land mobile network; and notifying the second security edge protection proxy of the public land mobile network identifier pair for interaction access.

\* \* \* \* \*